United States Patent [19]
Crane et al.

[11] Patent Number: 6,054,991
[45] Date of Patent: Apr. 25, 2000

[54] METHOD OF MODELING PLAYER POSITION AND MOVEMENT IN A VIRTUAL REALITY SYSTEM

[75] Inventors: Christopher Adam Crane, Washington, Mo.; Tom J. Bannon; Daniel Martin Donahue, both of Dallas, Tex.; Donald Wayne Adkins, Oak Leaf, Tex.; Judd England Heape, Dallas, Tex.; Andrew Kendall Smith, Boston, Mass.; Thomas M. Siep, Garland, Tex.

[73] Assignee: Texas Instruments Incorporated, Dallas, Tex.

[21] Appl. No.: 08/282,413

[22] Filed: Jul. 29, 1994

Related U.S. Application Data

[63] Continuation of application No. 07/801,144, Dec. 2, 1991.

[51] Int. Cl.[7] .................................................. G06T 15/00
[52] U.S. Cl. ............................................................ 345/420
[58] Field of Search ................................. 395/119, 120, 395/135; 345/419, 420, 435

[56] References Cited

U.S. PATENT DOCUMENTS

| | | | |
|---|---|---|---|
| 4,631,690 | 12/1986 | Corthout et al. | 395/120 |
| 4,645,459 | 2/1987 | Graf et al. | 395/135 X |
| 4,694,404 | 9/1987 | Meagher | 395/121 |
| 4,888,583 | 12/1989 | Ligocki et al. | 395/120 X |
| 4,985,854 | 1/1991 | Wittenburg | 395/121 |
| 5,123,084 | 6/1992 | Prevost et al. | 395/120 |
| 5,251,290 | 10/1993 | Pabon | 395/119 X |
| 5,261,028 | 11/1993 | Ueda | 395/119 |

OTHER PUBLICATIONS

Fuchs et al. "Near Real–Time Shaded Display of Rigid Objects", Computer Graphics, vol. 17, No. 3, Jul. 1983, pp. 65–72.

Naylor, "Binary Space Partitioning Trees as an Alternative Representation of Polytopes", Computer–Aided Design, vol. 22, No. 4, May 1990, pp. 250–252.

Bentley, "Multidimensional Binary Search Trees Used for Associative Searching", Communications of the ACM, Sep. 1975, vol. 18, No. 19, pp. 509–517.

Nadia Magnenat–Thalmann, *Multimedia, Virtual Reality and Computer Animation*, Proceedings Hypertext/Hypermedia '91 Graz, May 27, 1991, Berlin, pp. 1–17.

Mark Green, *Virtual Reality User Interface: Tools and Techniques*, CG International '90 Computer Graphics Around the World 1990, Berlin, DE, pp. 51–68.

S. R. Ellis, *Nature and Origins of Virtual Environments: A Bibliographical Essay*, Computing Systems in Engineering, vol. 2, No. 4, 1991, Oxford, GB, pp. 321–347.

*Primary Examiner*—Mark K. Zimmerman
*Attorney, Agent, or Firm*—Tammy L. Williams; Wade James Brady, III; Frederick J. Telecky, Jr.

[57] ABSTRACT

In a virtual reality system (20) an operator perceives being in a virtual reality world (74) of virtual reality images (62). The system (20) models the relative position and movement of objects (208 and 210) in a virtual reality world (74) by representing graphically a first (208) and second (210) object in a virtual reality world (74) on a graphical display (60 and 68). The representation selective obscures the first (208) and second (210) objects according to the relative position of the objects (208 and 210) to a predetermined observation point in the virtual reality world (74). The system (20) then determines a first partitioning plane (204) between the first (208) and second (210) objects. Then, the system (20) method determines a second partition plane (206) between the first (208) and second (210) object in response to either of said first (208) or second (210) objects moving across the first partitioning plane (204). Then, the system (20) graphically represent on the graphical display (60 and 68) the first (208) and second (210) objects within the virtual reality world (74) by selectively obscuring the first (208) and second (210) objects according to their relative position to the predetermined observation point.

26 Claims, 13 Drawing Sheets

244
Two players have left marking pylons at the end of this hall. Should you pick them up and move them, or leave one of your own to mark your path?

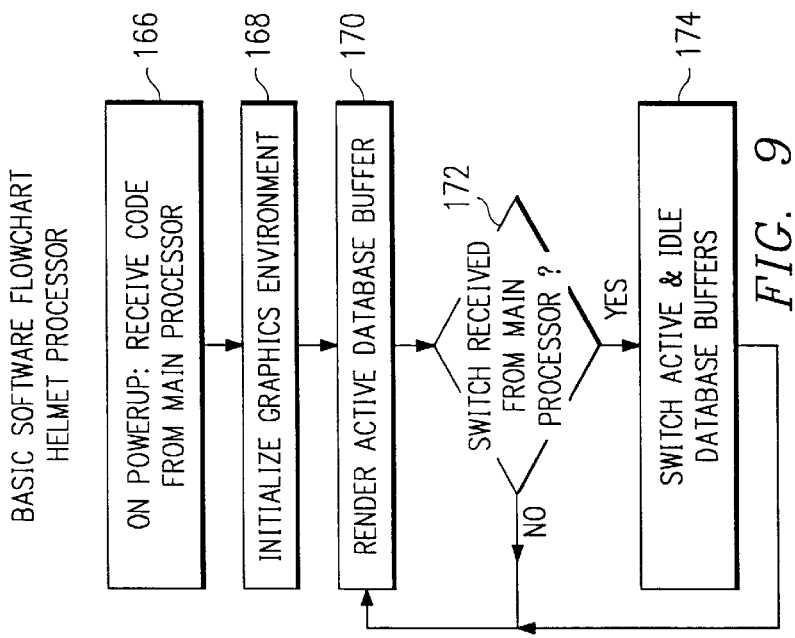
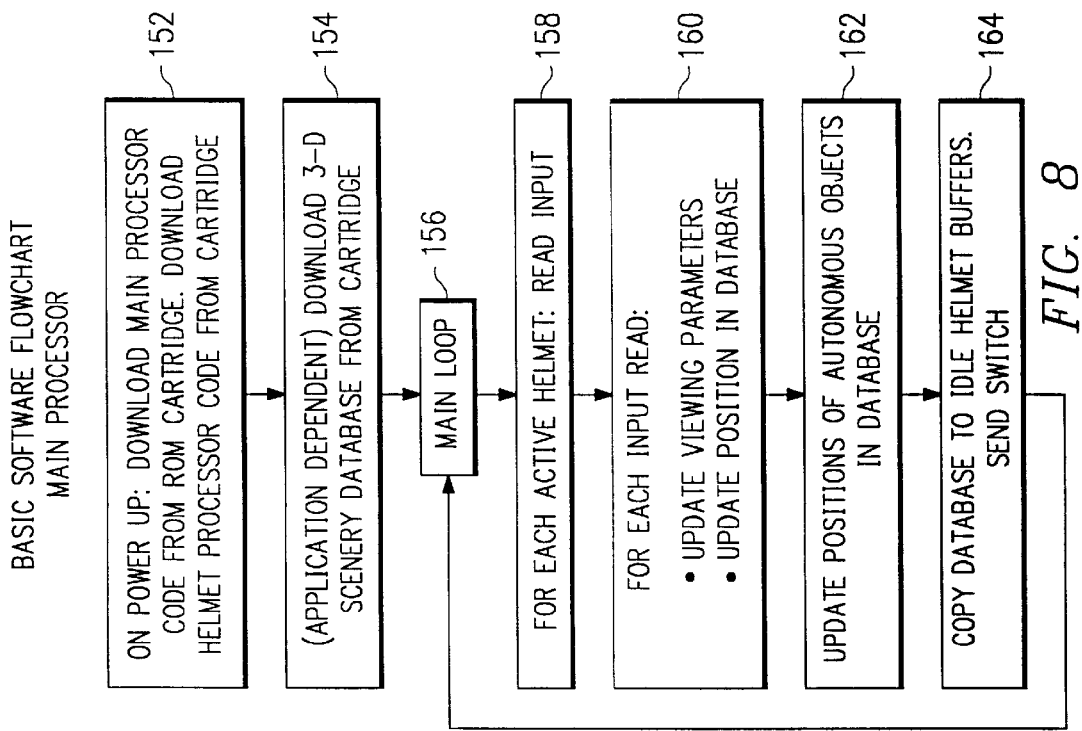

FIG. 10   THE DATABASE: A TYPICAL EXAMPLE
3-D BINARY PARTITIONED DATABASE

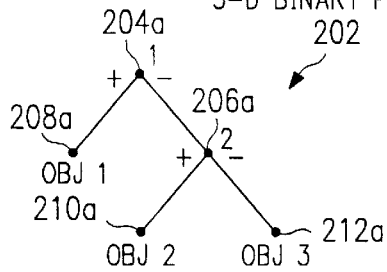
DATABASE REPRESENTATION:

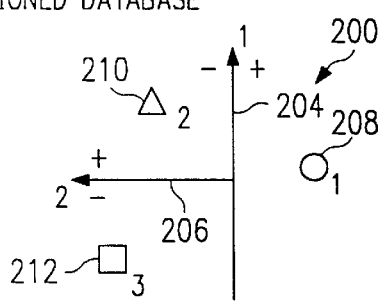
GRAPHICAL REPRESENTATION: (OVERHEAD VIEW)

- ● = INTERMEDIATE NODE. GIVES PARTITONING PLANE
- ● = TERMINAL NODE: INFO ON GRAPHICAL OBJECT

- → = PARTITIONING PLANE
- □$_n$ = GRAPHICAL OBJECT

MOVING OBJECTS AND THE DATABASE

TYPE 1: CONSTRAINED

IF AN OBJECT REMAINS WITHIN IT'S PARTITION, THE OFFSET TO THE OBJECT'S CENTROID MAY BE CHANGED. NO MODIFICATION TO THE DATABASE IS NEEDED.

FIG. 11

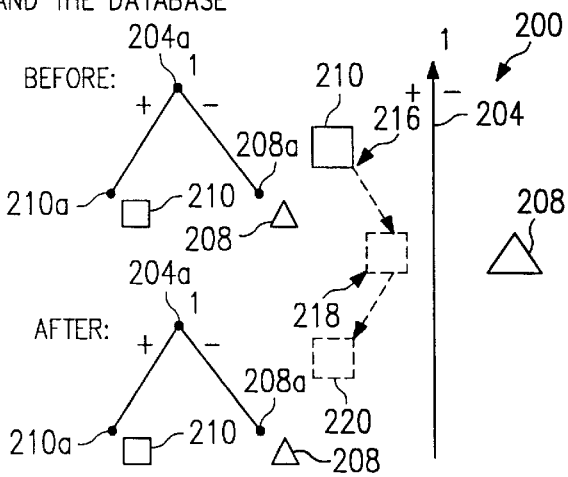

TYPE 2: PLANE-CROSSING

THE OBJECTS MAY MOVE WITHIN AND BETWEEN EMPTY PARTITIONS. THEY MAY NOT ENTER OCCUPIED PARTITIONS.

FIG. 12

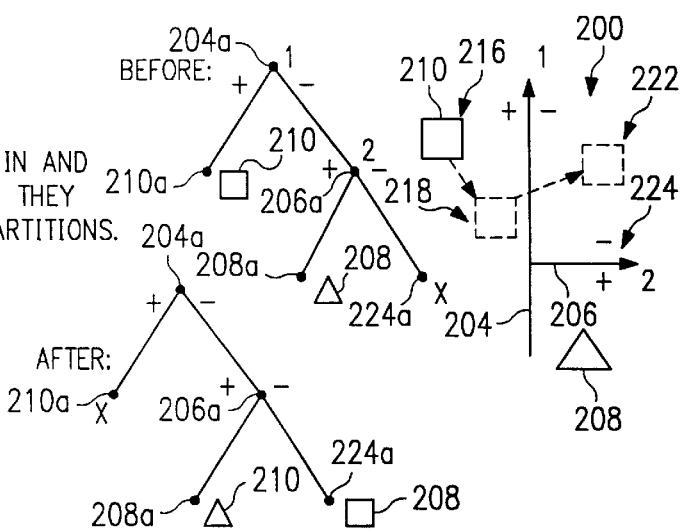

TYPE 3: FREE OBJECTS

THE OBJECTS MAY MOVE ANYWHERE THERE ISN'T ALREADY AN OBJECT, CREATING NEW PLANES AS NECESSARY.

FIG. 13

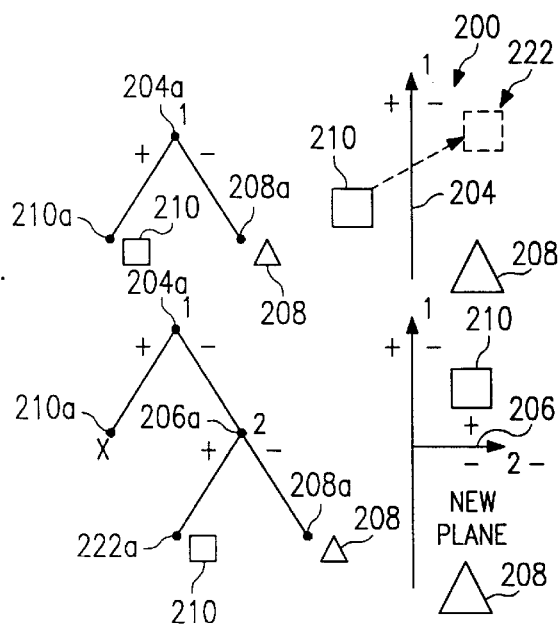

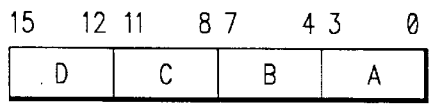

FIG. 14

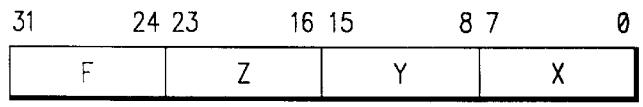

FIG. 15

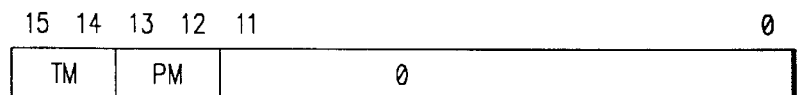

PAD MODE: 00 = NO PADDING OF BOUNDING BOX
10 = POSITIVE PADDING
11 = NEGATIVE PADDING
01 = UNDEFINED

TEST MODE: 00 = RETURN STATUS VALUE UNCONDITIONALLY
10 = IF INSIDE BOUNDING BOX, RETURN STATUS VALUE; ELSE CONTINUE TO NEXT TEST
11 = IF OUTSIDE BOUNDING BOX, RETURN STATUS VALUE; ELSE CONTINUE TO NEXT TEST
01 = UNDEFINED

FIG. 16

METHOD OF MODELING PLAYER POSITION AND MOVEMENT IN A VIRTUAL REALITY SYSTEM

This application is a Continuation of application Ser. No. 07/801,144, filed Dec. 2, 1991.

TECHNICAL FIELD OF THE INVENTION

The present invention generally relates to the applications of computer science to the generation of artificial environments, and more particularly to a low-cost virtual reality system and method for allowing a user to explore environments that exist as models in the memory of a computer.

BACKGROUND OF THE INVENTION

The design and use of virtual reality systems is a new and largely unexplored field of computer science. The object of a "virtual reality system" is to give users the ability to explore environments that exist only as models in the memory of a computer. These environments may be models of the real world (e.g., streets of Las Vegas or the interior of a building), or they may be representations of purely imaginary worlds, or worlds inaccessible by human beings (e.g., the interiors of molecules or the center of our galaxy).

A typical virtual reality system consists of a computer, input devices, and an output device. The computer maintains the model of the virtual world and calculates its appearance from the view point of the user. The output device is often an apparatus that mounts on the user's head and may be either a display or screen mounted to a helmet or a pair of goggles. By wearing the helmet, the user visually immerses himself or herself in the virtual world. Also, attached to the helmet are tracking devices that enable the computer to know about the position of the user's head and in what direction the user is looking. The input devices found on a typical system range from simple joysticks to gloves or other body wear that may monitor a user's movements and gestures.

One significant limitation that must be overcome to yield a workable virtual reality system is to provide a method and system that gives the player the impression that he is moving in a three-dimensional world. This requires, first of all, a method to generate and change three-dimensional perspective images on a display as a function of inputs from the player. Secondly, this requires a way for the player to "move himself" within the image display. A viable virtual reality system must perform these operations in real-time. Moreover, for the purpose of providing an economical virtual reality system, these operations must be capable of performance with easily available and low cost microprocessing components.

Thus, there is a need for an economical method and system to implement player movement in a three-dimensional virtual reality world.

There is a need for a method and system that generate, for a low-cost virtual reality system, three-dimensional perspective images that change perspective according to player inputs.

There is a need for a method and system that permit the player to "move himself" within the three-dimensional image display of a low-cost virtual reality system.

Further, there is a need for a method and system can achieve the above objectives in readily available, low cost microprocessing components.

SUMMARY OF THE INVENTION

The present invention, accordingly, provides a method and system of modeling player position and movement in a virtual reality system. One aspect of the invention is a method of modeling the relative position and movement of objects in a virtual reality environment.

The method includes the steps of representing graphically a first and second object in a virtual reality environment on a graphical display. The graphical representation obscures the first and second objects according to the relative position of the first and second objects to a predetermined observation point within the virtual reality environment. The method includes determining a first partitioning plane between the first and second objects. Then, a second partitioning plane between the first and second objects is determined in response to the first or second object moving across the partitioning plane. The method then involves representing graphically on the graphical display the first and second objects within the virtual reality environment. This is done by selectively obscuring the first and second objects according to the relative position of each of these objects from the predetermined observation point in the virtual reality environment. This is done according to the positions of the objects relative to the second partitioning plane.

The method of the present invention may generate numerous partitioning planes depending on the number of objects and their relative positions to the predetermined observation point. The effect of the method of the present invention is to create and permit a player to operate within a virtual reality world, but combines a three-dimensional partition database with a moving objects algorithm. The binary partition database of the present invention solves the problem of selecting which things to render and when to render them in the virtual reality system display.

A technical advantage of the present invention is that it provides an economical method and system to implement player movement in a three-dimensional virtual reality world.

Another technical advantage of the present invention is that it combines effectively with a known moving object algorithm, such as a flight simulator algorithm to yield a low-cost way of generating three-dimensional images that change their perspective according to player inputs to a virtual reality system.

Yet another technical advantage of the present invention is that it combines with a moving object algorithm so that a player can "move himself" within the three-dimensional image display of a low-cost virtual reality environment. In particular, the present invention achieves these results using readily available, low-cost microprocessing components and supports the purpose of yielding a low-cost virtual reality system.

BRIEF DESCRIPTION OF THE DRAWINGS

The invention and its modes of use and advantages are best understood by reference to the following description of illustrative embodiments when read in conjunction with the accompanying drawings, wherein:

FIG. 8 provides a basic software flow chart for the main processor of the preferred embodiment;

FIG. 9 provides a basic software flow chart for the helmet processor of the preferred embodiment;

FIGS. 10–13 illustrate moving objects and object database of the preferred embodiment;

FIGS. 14 through 18 illustrate the fields for the longwords that the preferred embodiment used to implement moving object algorithm and 3-D binary partitioned database; and FIGS. 19 and 20 provide an illustrative example of an application using the system and method of the preferred embodiment.

DETAILED DESCRIPTION OF THE INVENTION

The preferred embodiment of the present invention is best understood by referring to the FIGUREs wherein like numerals are used for like and corresponding parts of the various drawings.

System Overview

Figure 1:
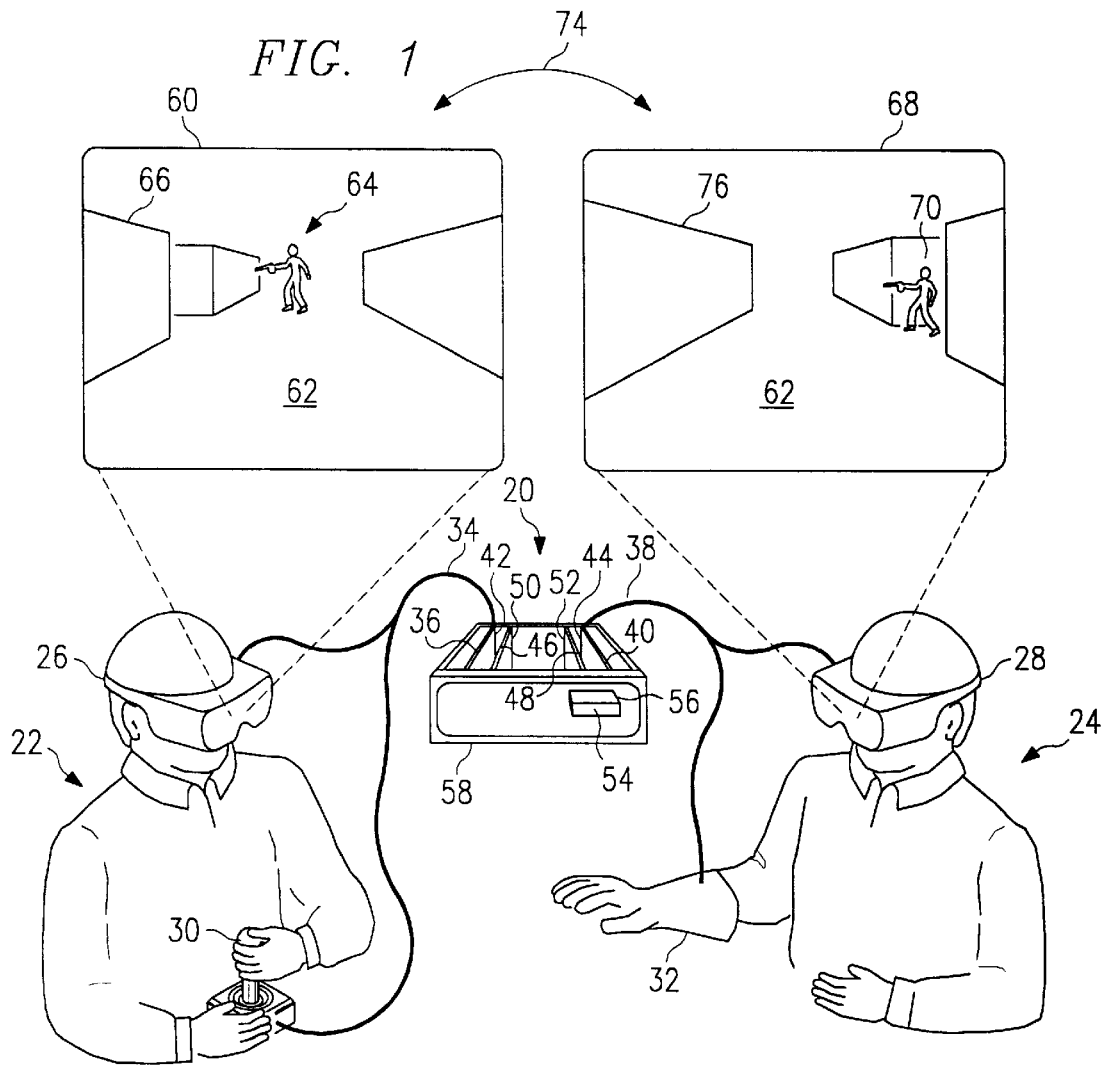
FIG. 1 provides a conceptual illustration of two players using the preferred embodiment of the present invention.

FIG. 1 shows the preferred embodiment of the virtual reality system 20 being used by two players 22 and 24. Each player wears a helmet or goggles 26 and 28, respectively, and uses an input device. For example, player 22 controls his movements in the virtually reality world via joystick 30, while player 24 controls his movements by power hand attachment 32. Goggles 26 and joystick 30 connect via cable 34 to helmet card 36. Similarly, goggles 28 and power hand attachment 32 connect via cable 38 to helmet card 40. Helmet cards 36 and 40 fit within chassis 58 at slots 42 and 44, respectively, while additional cards 46 and 48 for additional users, if desired, fit within slots 50 and 52.

In the example that FIG. 1 shows, cartridge 54 fits within slot 56 of chassis 58 for providing the game that players 22 and 24 are playing. In the preferred embodiment, cartridge 54 may be one any number of games that the players may select. For example, FIGS. 19 and 20, below, describe a game called "GRACE" that may be used with the preferred embodiment. In the particular example of FIG. 1, player 22 through goggles 26 views display 60 containing environment 62. Within environment 62, surrogate player 64 takes actions according to the commands that player 22 issues through joystick 30. For example, within environment 62, player 22 directs surrogate player 64 to pass through maze barriers 66.

At the same time player 22 views environment 62 on display 60 of goggles 26, player 24 views display 68 within goggles 28. Player 24 views the same environment 62 that player 22 views. However, player 24 controls surrogate player 70 through barriers 72 in pursuit, for example, of surrogate player 66. Player 24 issues commands for control of surrogate player 70 through power hand attachment 32 and movement of goggles 28. The result is that players 22 and 24 operate within the virtual reality world 74 that the virtual reality system 20 of the preferred embodiment creates.

System Hardware

Figure 2:
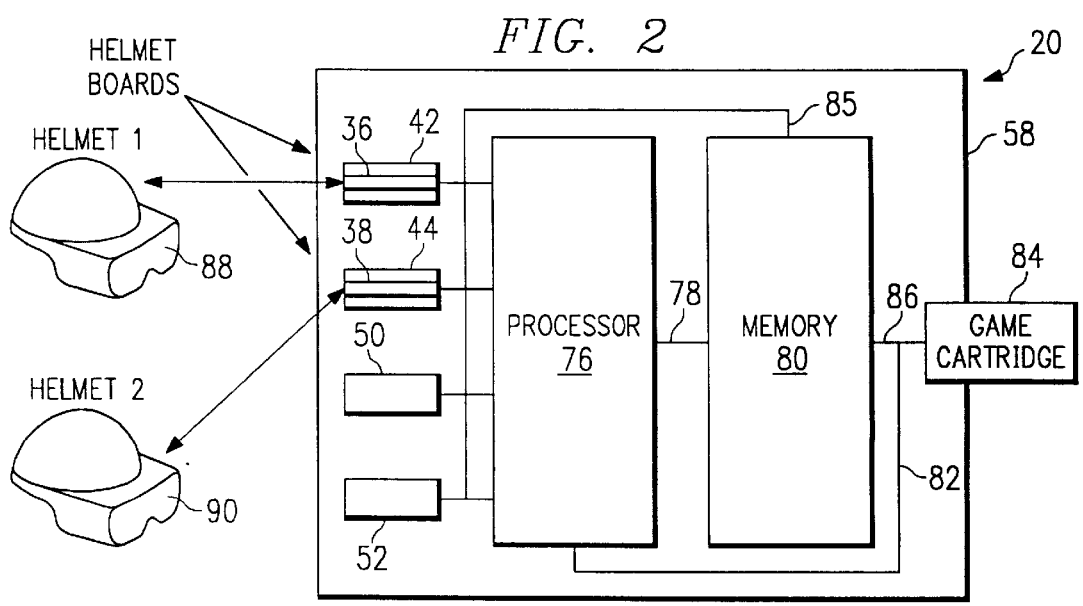
FIG. 2 provides a schematic block diagram of the overall architecture of the virtual reality system of the preferred embodiment.

FIG. 2 provides a conceptual block diagram of the overall architecture of the virtual reality system of the preferred embodiment. According to FIG. 2, the preferred embodiment consists of processor 76 which communicates via bus 78 to memory circuit 80 and through bus 82 to ROM card reader 84. Memory circuit 80 also communicates through bus 86 with ROM card reader 84. Helmet boards 36 and 38 connect to helmet 1 circuit 88 and helmet 2 circuit 90, respectively. Helmet 1 circuitry, for example, may comprise circuitry for goggles 26 and joystick 30 of FIG. 1, while helmet 2 circuitry 90 may include goggles 28 and power hand attachment 32. The architecture of the preferred embodiment accommodates four helmet cards, such as helmet card 36 and 38 within slots 42, 44, 50 and 52.

According to the system architecture, a player uses the virtual reality system by inserting a game cartridge 54, for example, through slot 56 and into ROM card reader 84. Processor 76 directs ROM card reader to automatically read game cartridge 54 and download game software and a representation of the virtual world into system memory 80. Processor 76 then examines helmet board slots 42, 44, 50 and 52 to determine how many players will participate in the game. In the preferred embodiment, each helmet is used by only one player. As the game program proceeds, processor 76 reads input from helmet boards 36 and 38, for example. The input describes the current status of the player, including the player's head position and any data from the input devices attached (e.g., joystick 30 or power hand attachment 32). Processor 76 analyzes the input and updates the status of the game appropriately. This involves updating the state of a database that represents the model of the virtual reality world 74. During the read/update process, helmet boards 36 and 38 are prohibited from reading the world database. After the database is updated, processor 76 instructs each helmet board 36 and 38 to begin drawing the view of the virtual reality world 74 as seen from each player's point of view.

Figure 3:
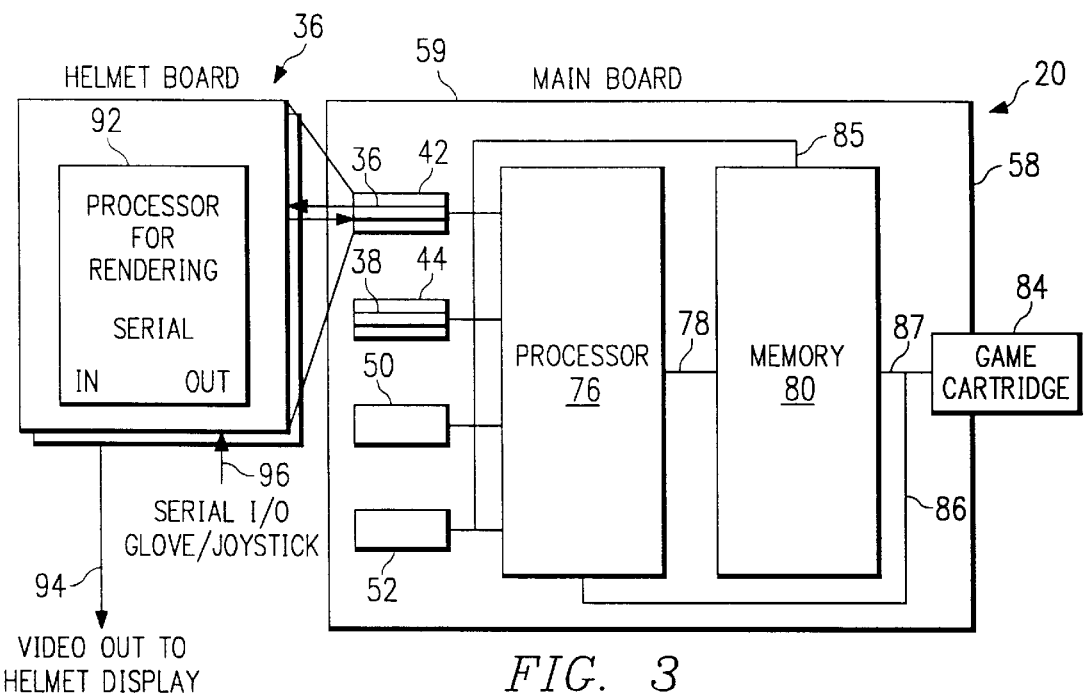
FIG. 3 provides a schematic block diagram of the helmet board architecture of the preferred embodiment.

Helmet boards 36 and 38 insert into main chassis 58 with one helmet board per player in a game. FIG. 3 shows that helmet board 36 consists of helmet board processor 92 that reads a virtual world database from memory 80 of main board 59 via parallel bus 85. Main board 59 files within chassis 58 of FIG. 1. Helmet board processor 92 renders the view of the virtual world from the player's standpoint via video connection 94 to the player's helmet display. Bus 85 also connects processor 76 to helmet board 36. Connecting helmet board 36 to processor 76 of main board 59 allows helmet board 36 to direct input data from the helmet or goggles 26 and joystick 30 or another input device via serial I/O 96 directly into main board memory 80. The helmet or goggles 26 attaches to helmet board 36 via a simple data strip connection. Helmet board processor 92 outputs a rendered scene to the video display 60 in helmet 26. Helmet board processor 92 also generates any audio signals that may be sent to speakers or earphones that may be mounted on the player's helmet or goggles 26. In the preferred embodiment, helmet board processor 92 renders the scene via connection 94 only when directed to do so by processor 76.

FIG. 3 also shows ROM card reader 84 for receiving and reading game cartridge 54. Game cartridges 54 may contain game mechanics, helmet board 36 and 38 output interpretation, and one or more virtual reality worlds in the form of databases. Cartridges 54 are inserted in the main chassis 58 at slot 56 (See FIG. 1), at which point their contents are directly loaded into main board processor 76 and memory 80.

Figure 4:
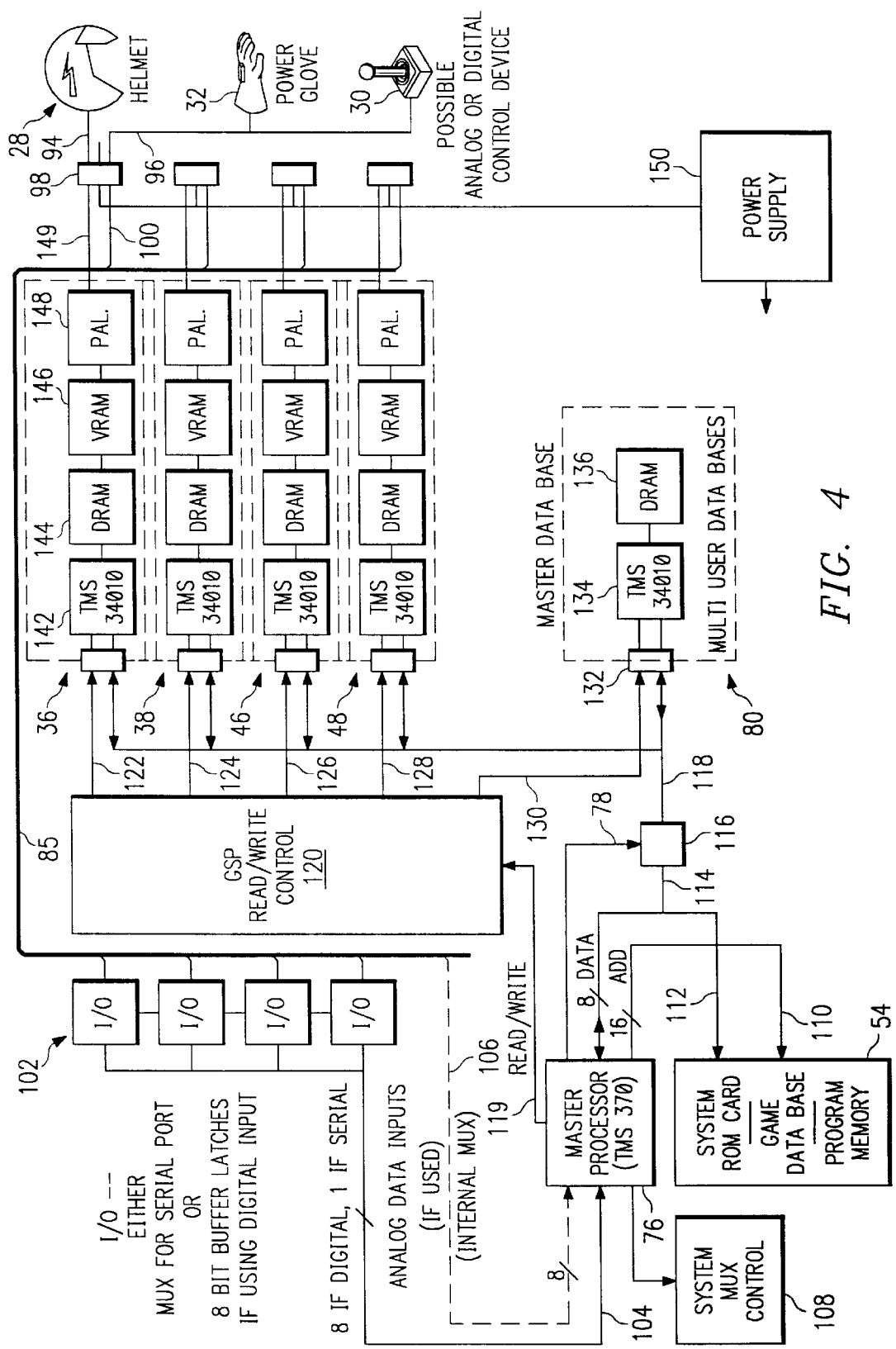
FIG. 4 provides a schematic block diagram of the virtual reality system of the preferred embodiment.

FIG. 4 shows a schematic block diagram of the circuitry of the preferred embodiment. Beginning at power glove 32, serial I/O connection 96 goes to interconnection 98 for sending input signals via bus 100 to main board bus 85.

Main board input bus 85 directs input data via I/O latches 102 to bus 104. Bus 104 sends input signals to master processor 76. Input bus 85 may be either digital or analog for providing digital or analog inputs. If an analog input is used, I/O latches 102 may be either a multiplexer (MUX) for a serial port or 8-bit buffer latches, for digital input to master processor 76. Similarly, input bus 104 may be either a single bit if serial data is used or an 8-bit bus if parallel input is used. Additionally, if analog data inputs are used, bus 106 may serve as an input bus for an internal multiplexer. Master processor 76 provides input to system multiplexer controller 108, 16-bit address input to system ROM card 54 through address bus 110 and 8-bit data, through input data bus 112. Data bus 112 provides data input by way of bus 114 to switch 116 into memory 80. Switch 116 is controlled by master processor 76 by control signals from bus 78 and sends data from bus 114 along bus 118 to memory 80

Master processor 76 also sends read/write control signals to GSP read/write controller 120. GSP read/write controller 120 provides control inputs to helmet cards 36, 38, 46 and 48 by way of respective buses 122, 124, 126, and 128. Additionally, bus 130 from GSP read/write controller 120 provides inputs to memory 80. At connection 132, memory 80 receives control signals on bus 130 and data input and processor control input bus 118 from switch 116.

Memory 80 contains processor 134 and DRAM 136. In the preferred embodiment, processor 134 comprises a Texas Instruments TMS 34010 processor. Memory 80 also communicates master database signals to helmet cards 36, 38, 46 and 48 through bus 138.

Each of the helmet cards 36, 38, 46 and 48 connects to the circuitry of the preferred embodiment at connection 140 and contains processor 142 which directs data signals to DRAM 144. DRAM 144 provides data input to video RAM (VRAM) 146, which directs video data to palette 148. Palette 148 sends color palette data through output bus 98 to interconnection and along video connection 94 to helmet 28.

Each of the helmet cards 36, 38, 46 and 48 are controlled by GSP read/write controller 120 to send rendering data to an associated helmet 28 in response to read/write control signals from bus 119. Signals on bus 119 come from master processor 76 to control each of the individual helmet cards 36, 38, 46 and 48. Output from processor 142 of helmet card 36, for example, is temporarily stored in DRAM 144 which outputs to the video RAM ("VRAM") 146. VRAM 146 is the RAM that the scene is rendered onto and provides the data from which pallet 148 may render the video image to the display within helmet 28.

In the preferred embodiment, power supply 150 provides conditioned power to all of the system circuitry as well as to the input and output devices connected to interconnection 98. Additionally, an alternative embodiment may include a possible analog or digital control device such as joystick 30. Helmet 28 may also provide an input to the virtual reality system that describes the helmet orientation. For example, helmet 28 may provide tracking devices that use ultrasound or other recognized methods to track a player's movement of the helmet. The data that helmet 28 communicates to the virtual reality system of the preferred embodiment, whether orientation information as to the player's head position or simply display data to the display circuit of helmet 28, all data is treated as serial input and output data.

For the preferred embodiment, four players may use the virtual reality system by connecting to each one of the interconnections 98 an input for a respective helmet cards 36, 38, 46 and 48. In such case, through interconnections 98 and bus 85, master processor 76 reads input from one to four players and decides what needs to be done with regard to the master database of memory 80. In response to signals from master processor 76, microprocessor 134 of memory 80 makes any changes necessary to make objects move or otherwise respond to commands from the players. Once the database is changed according to the inputs from master processor 76, the signals go to helmet card 36, 38, 46 and 48 for ultimate display at each of the helmets 28 that may connect to one of the connections 98. Thus, in response to inputs from power glove 32 or joystick 30 for example, an infinite loop is established in the system that continues to render to the connected helmet cards to update visual information at the display of helmet 28.

Figure 5A:
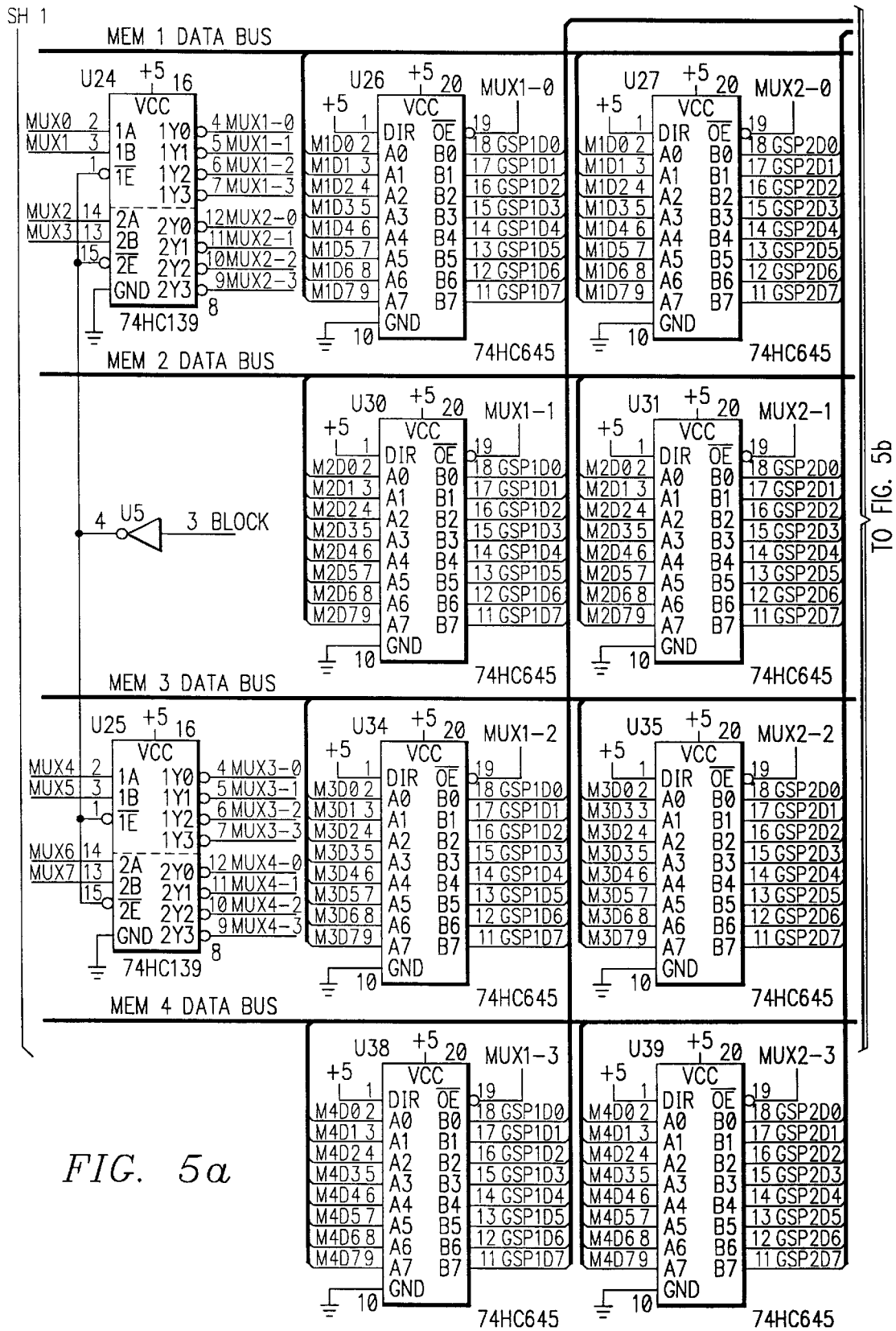
FIGS. 5–7 provide detailed schematic diagrams for the preferred embodiment.
Figure 5B:
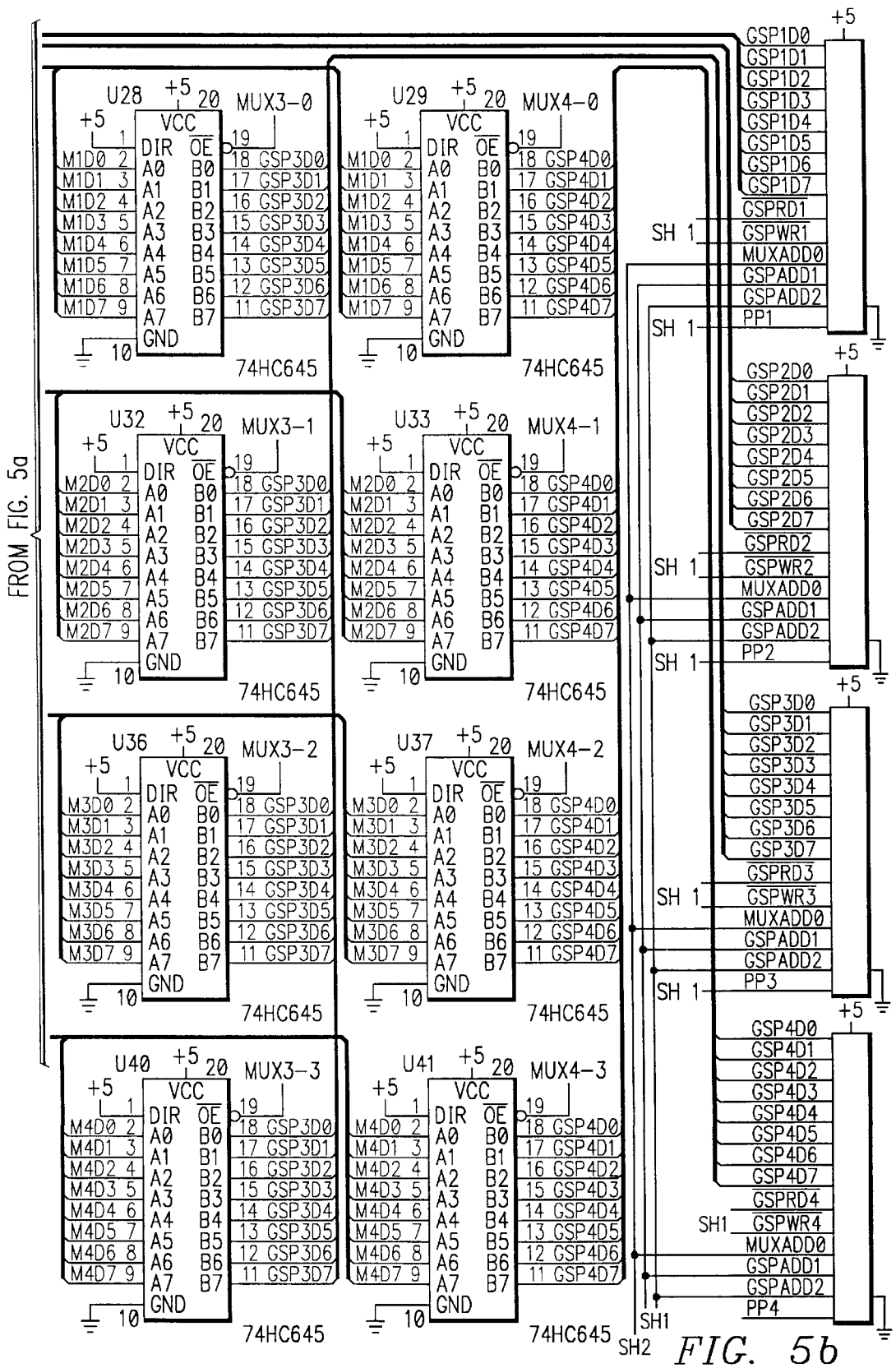
Figure 6A:
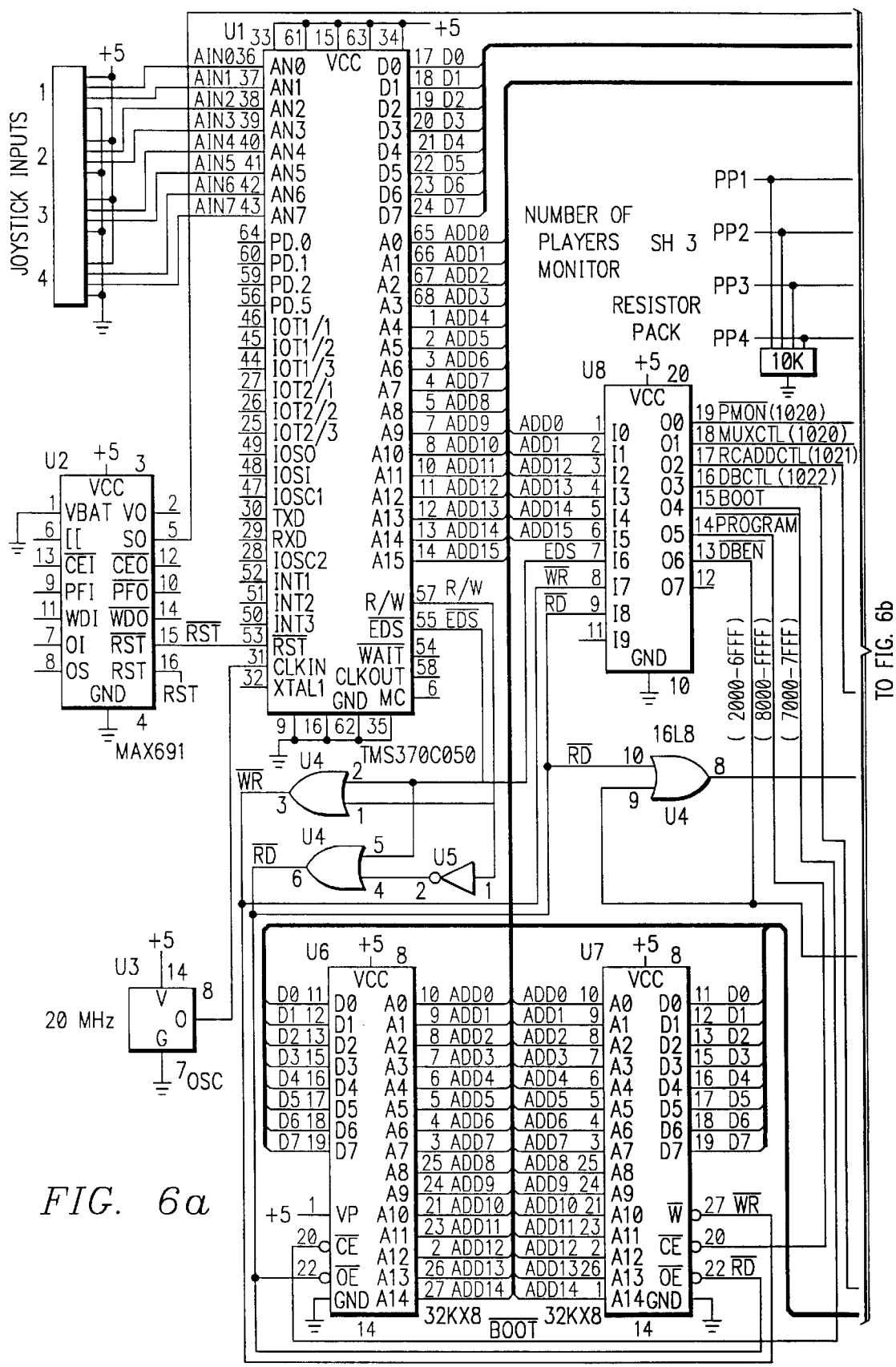
Figure 6B:
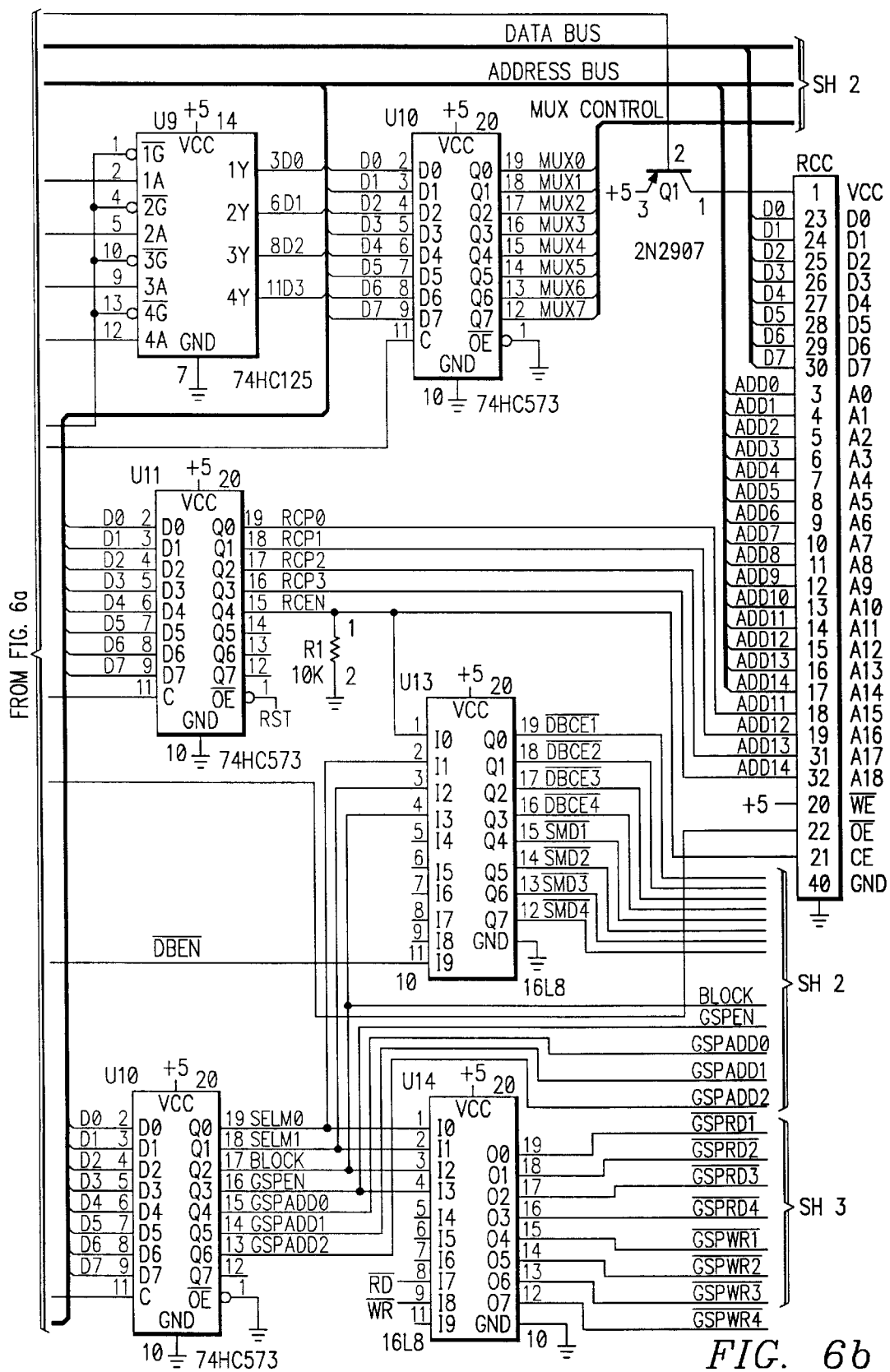
Figure 7A:
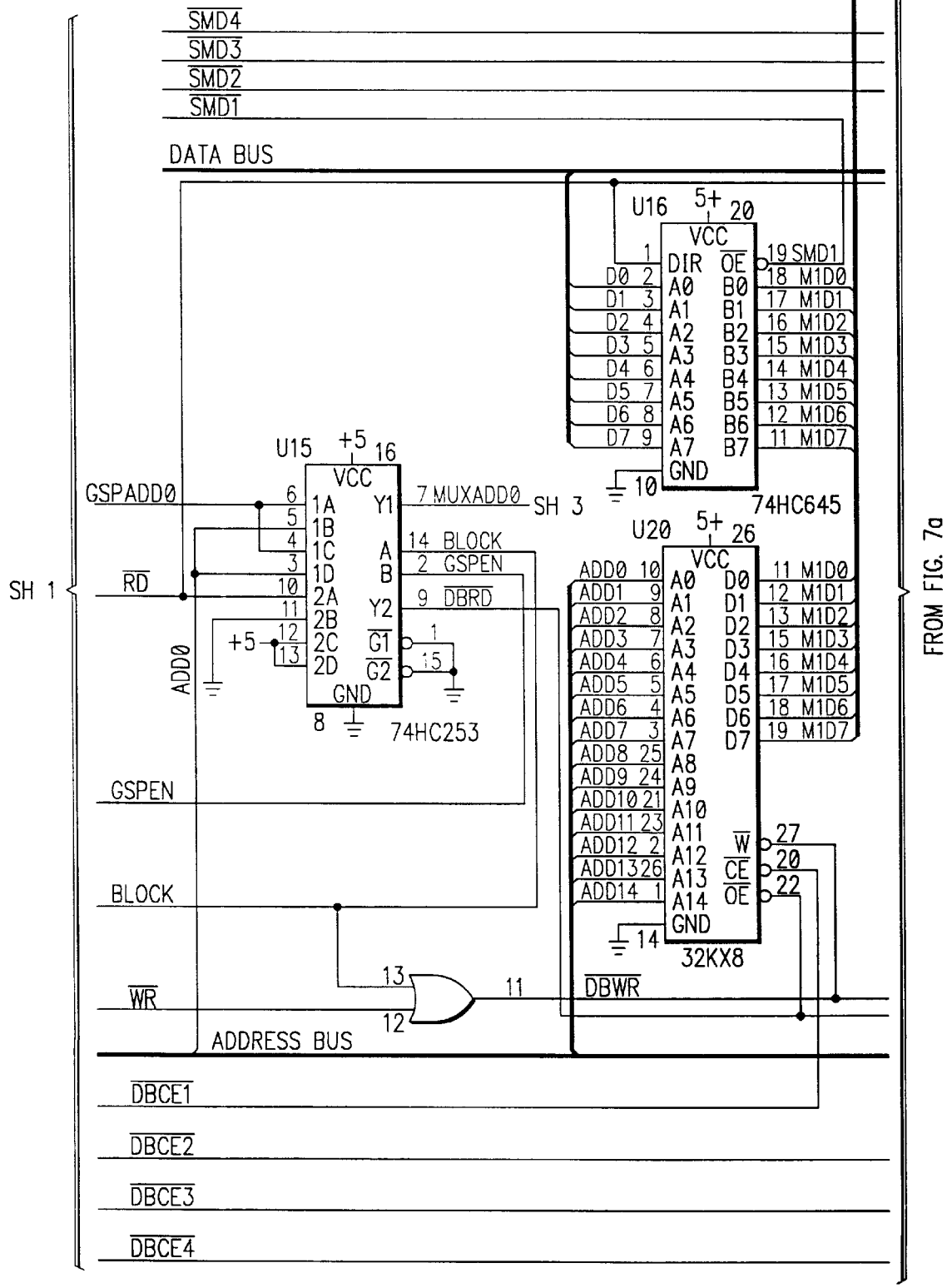
Figure 7B:
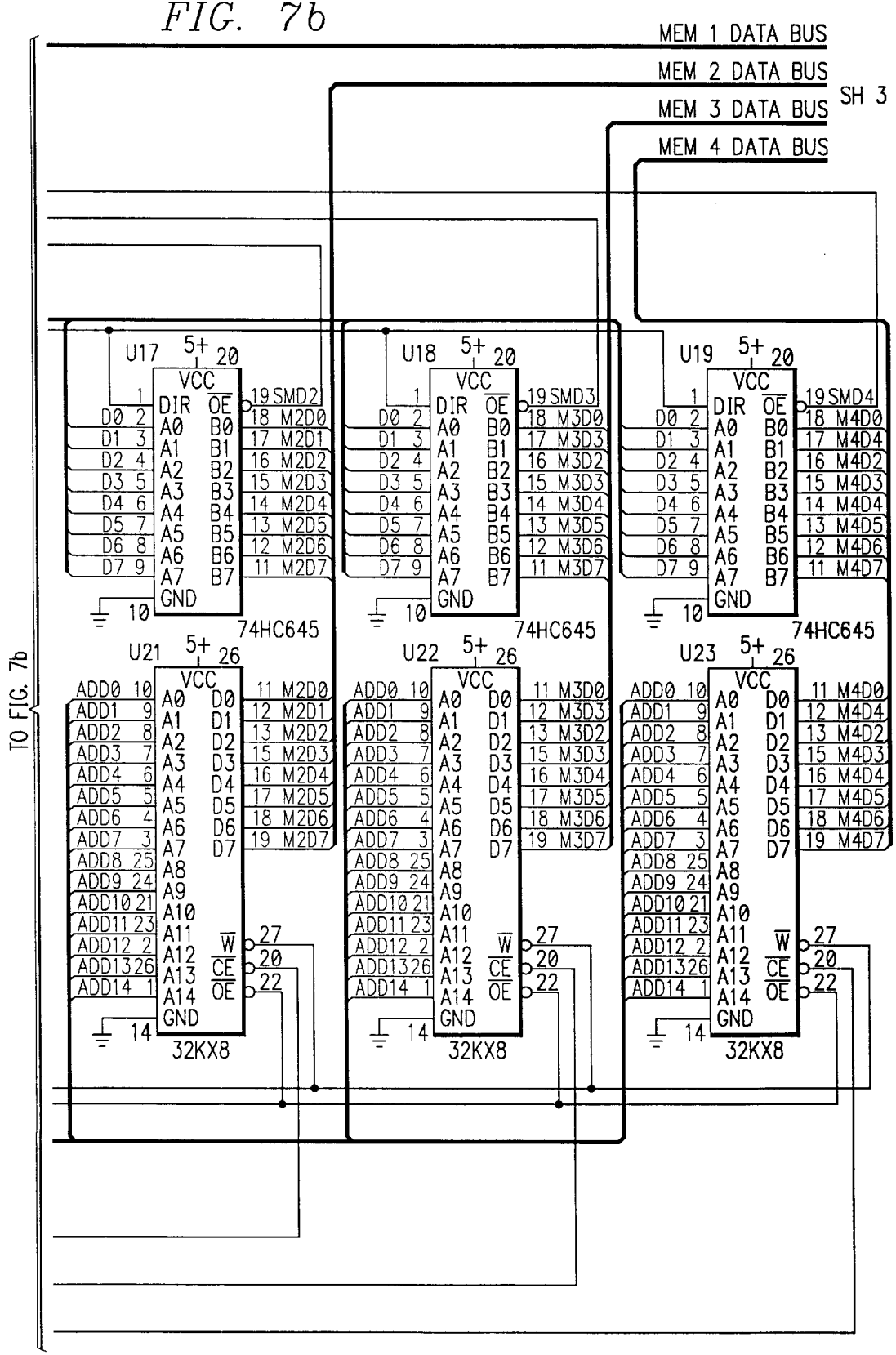

FIGS. 5, 6, and 7 provide detailed schematic diagrams that illustrate the implementation of the preferred embodiment using commercially available components.

System Software

A. Overall Control Flow.

FIG. 8 shows the basic software flow chart for the main processor 76 of the preferred embodiment. Beginning at the ON POWER UP step 152, the virtual reality system downloads the main processor code and helmet 26 processor code from ROM cartridge 54. Then, at step 152 the main processor downloads the three-dimensional (3-D) scenery database from cartridge 54. The purpose of these steps is to read the game mechanics into memory 80, read the world database into the shared memory, and initialize the virtual world parameters.

Once these initial steps take place, the preferred embodiment begins a loop at step 156. The loop begins for each active helmet 28. That is, for each helmet for which a helmet card 36, for example, is connected at slot 42 each active helmet step 158 reads the input. If the helmet is detected, the program sets the render bit for that helmet to false. If the helmet is detected for the first time, then the basic software of the preferred embodiment inserts the player into the game. Otherwise, the software gets the latest output from the helmet card 36, for example. If no helmet is detected in the loop, then the slot which would otherwise contain a helmet card is skipped. For each input read at step 160, the preferred embodiment updates the viewing parameters and updates the position of the viewer and the database. In essence, this step interprets all inputs from the helmet and updates the master database in memory 80 accordingly.

Next, at step 162 the basic software for main processor 76 updates the positions of the autonomous objects in the database. Then, at step 164, the control program copies the database to all the idle helmet buffers and directs the information to be sent to each of the helmets 26. This, essentially, comprises the step of setting a render bit in the rendering processor 92 of the helmet board 36 for rendering the new image on the helmet 28 display.

FIG. 9 shows the basic software flow chart for helmet processor 92 of the preferred embodiment. As in the case of processor 76 for main board 59, processor 92 for the helmet board 36, for example, begins with step 166 for ON POWER UP at which point processor 142 receives code from main processor 76. With this code, at step 168, helmet processor 142 initializes the graphics environment for the particular application of the preferred embodiment. Next, at step 170, a loop begins for rendering the active database buffer to the helmet 28 display. Query 172 takes place next to determine if a switch signal (i.e., the previously identified render bit) has been received from main processor 76. If the bit has been set to "true", then at step 174 helmet board 136 renders the current scene. Then the loop continues back to step 170 to render the active database buffer. If the bit has not been set to true by the main processor 76, then at step 172 the loop returns to step 170 to render the active database buffer. This process is commonly known as "double buffering".

B. Data Structures.

This section of the Detailed Description provides an in-depth explanation of the binary sectioning plane (BSP) database structure, with emphasis on extensions that allow objects to move through the database.

1. BSP, Moving Object Extensions Overview.

The method that the present invention employs to create and permit a player to operate within a virtual reality world combines a 3-D binary partitioned database with a moving object algorithm. The 3-D binary partitioned database solves the problem of selecting which things to render and when to render them on the helmet 28 display. The moving object algorithm includes an adaptation of an existing flight simulator algorithm for the purpose of simulating the movement of objects in a 3-D virtual reality environment. By combining the 3-D binary partitioned data base solution with the moving object algorithm a master database is created from which all players may receive information of the virtual reality environment in which they play.

The 3-D binary partitioned database and moving object algorithm will be discussed generally. Thereafter, they will each be discussed in more detail. The moving object algorithm is a modified version of an algorithm developed for flight simulators in the late 1960s the chief advantage of which is that it makes possible a real-time solution to the hidden surface problem without expensive z-buffer hardware. The prototype moving object algorithm is an example of a real-time 3-D application running on the Texas Instruments TMS 34010 or TMS 34020 graphics processors. The 3-D binary partitioned database is constructed based on the designer's a priore knowledge of object placement. While satisfactory for small static worlds the approach for a virtual reality environment with a large number of objects that move relative to each other is not a trivial extension.

In writing the moving object algorithm, the bulk of the effort has been directed toward achieving real-time animation given a reasonably complex 3-D scene. The Graphics Signal Processor (GSP) 120 does most of the calculations and all of the drawing. The majority of the GSP's 120 time is spent executing the hand-tuned assembly code of the 3-D pipeline that interprets the database, transforms the coordinates, and draws the polygons. The 3-D database (currently about 7K bytes) is downloaded to the GSP 120 so that the GSP 120 does not incur the overhead of accessing the database through the GSP's 120 host interface registers. Each new frame requires that only a small amount of information be exchanged between the PC host processor 76 and GSP 120. The host gives the GSP 120 the current position and orientation of the simulated player. The GSP 120 responds by telling the host whether the player has run into any of the objects in the 3-D scene.

The movement characteristics of each player are simulated on host processor 76. The current model is intended to be easy for the novice to control, and gives the user the freedom of movement to explore the 3-D scene at will. For ease of access, the behavior model for the moving object algorithm is written in C, and is contained in the host processor-resident portion of the moving object algorithm. The software has been structured to largely isolate the changes required to improve the model to a single module—the function "cmd_interpret" contained in source file "interp.c." Given that the GSP 120 does almost all the work, the moving object behavior model on the host processor has room to expand before real-time performance will suffer.

The 3-D binary partitioned database, which will be described in detail later, is structured as a binary tree. Each terminal (or leaf) node in the tree represents a single object; an intermediate (or nonleaf) node represents a group of objects. During the development and testing phase, each leaf node in the tree can be designated in turn as the root node, and displayed by the moving object algorithm. This isolates the data in one node from possible errors elsewhere in the database, and facilitates orderly testing of individual 3-D objects in the database. When several nodes have been verified, they can be linked into small subtrees for further testing.

The current implementation has been tested at 1, 4 and 8 bits per pixel. At pixel depths of 4 and 8 bits, the color selection is limited to 16. In the case of a monochrome display, a 4×8 dither pattern is substituted for each of the 16 colors. Careful selection of colors and placement of objects in the 3-D scenery database are necessary due to the limited number of colors available.

2. Graphical Description of Moving An Object Through A BSP.

Referring to FIG. 10, there is shown a graphical representation 200 alongside a database representation 202 that together conceptually illustrate the operation of the 3-D binary partitioned database of the preferred embodiment. In graphical representation 200, partitioning planes 204 and 206 illustrate that the database uses to deal with after the objects 208, 210 and 212. Graphical representation 200 may be thought of as an overhead view of the three objects 208, 210 and 212 positioned on a flat surface having partitioning plane 204 and 206. Partitioning planes 204 and 206 are established according to the relative position for the objects on the flat surface. Partitioning plane 204 has a + side and a − side and partitioning plane 206 has a + side and a − side. Partitioning planes 204 and 206 establish relative positions of the objects appearing in graphical representation 200. In the example, object 208 is on the + side of partitioning plane 204. Objects 210 and 212 are on the − side of the partitioning plane 204. Object 210 is on the + side of partitioning plane 206 and object 212 is on the − side of partition plane 206.

Database representation 202 shows how the graphical representation 200 may be viewed according to the 3-D binary partition database of the preferred embodiment. Beginning at node 204a, the database can construct a partitioning tree such that object 208 is on the + side of node 204a and objects 210 and 212 are on the − side of node 204a. Furthermore, on the + side of node 206a, object 2 appears and on the − side of node 206a object 3 appears. In the database representation 202, nodes 204a and 206a are considered intermediate nodes that relate to the partitioning plane of the 3-D binary database that the preferred embodiment database uses. Node 208a, 210a and 212a provide information on the graphical object to be rendered to the helmet 28 display.

FIGS. 11 through 13 illustrate how the 3-D binary partitioned database of the preferred embodiment deals with the relative positions and obscuring of objects that occur as a result of operation of the moving object algorithm in the preferred embodiment. As graphical representation 200 illustrates, object 210 moves from position 216 through position 218 to ultimate position 220. Object 208 remains in its initial position during this movement. Partitioning plane 204 throughout this movement, continues to separate object 210 from object 208. As a result, although the offset in the graphical representation to the object 210 centroid may be changed as object 210 moves finally to position 220, no modification of the 3-D binary partitioned database, is necessary. Since object 210 does not move through partitioning plane 204, the database nodes 204a having a + side and a − side with object positions 208a and 210a permit the continued description of the relative position of objects 208 and 210 to be the same after the movement as before the movement. This is not the case in the movement that FIG. 12 describes.

In FIG. 12, object 210 moves from position 216 to position 218 and ultimately to position 222. Object 208 remains in its original position. Notice that as object 210 moves to through position 218 and position 220, it crosses partitioning plane 204. Once object 210 crosses partitioning plane 204, it is necessary to establish partitioning plane 206. Partitioning plane 206 has a + side and a − side to maintain the relative position of object 210 to object 208. The 3-D binary partitioned database of the preferred embodiment achieves this result by establishing node 206a as database representation 202 of FIG. 12 illustrates. Note that node 206a has a + side and a− side exists where at node 208a object 208 is identified. The binary partition database of the preferred embodiment solves the problem that arises when object 210 crosses partitioning plane 204 in the instance that an unoccupied or empty partition. For example, in graphical representation 200 of FIG. 12, object 210 moves through position 218 to position 222 within unoccupied partition 224. Since partition 224 is already established, an existing, but empty, node 224a exists in database representation 202. As object 210 moves to position 222, in the database 210 simply moves from node 210a to node 224a. In this type of movement, objects may move within and into partitions. They may not, however, enter occupied partitions. Thus, if in the virtual world a wall or some other structure exists that would prohibit an object's moving into a partition, the software prohibits movement of the object into the partition. The graphical representation 200 that results is one where the object simply stops or is deflected by the prohibiting structure.

FIG. 13 illustrates what occurs when an object attempts to move into an existing partition occupied by another object but for which space exists for movement into the partition. Graphical representation 200 shows object 210 moving to space 222 where there is no pre-existing partition. In response to this movement, the 3-D binary partitioned database of the preferred embodiment creates partitioning plane 206 having a + side and a − side. The database representation 202 first shows that object 208 be represented by node 208a and object 210a by node 210a. After constructing partitioning plane 206, however, the database representation shows that node 206a representing the partitioning plane is constructed having the object nodes 208a and 222a. Object 208 associates with object node 208a and object 210 now associates with node 222a. As a result, for the objects 208 and 210, the binary partition database of the preferred embodiment permits movement anywhere that there isn't already an object or obstruction. In so doing, the 3-D binary partitioned database creates new partitioning planes as necessary.

In addition to the 3-D binary partition database, the preferred embodiment uses a moving object algorithm to illustrate the use of the device. Appendix A provides a listing of the source code for the 3-D binary partition database and the moving object algorithm in connection with the moving object algorithm of the preferred embodiment.

The moving object algorithm is split into two main modules, one of which executes on the host processor 76, and the other of which executes on GSP 120.

3. Coordinate Systems.

Several coordinate systems are used by the 3-D moving object algorithm. These coordinate systems are used to describe positions in the object space, in the virtual world space, in the player's viewing space, and on the viewport surface.

The object coordinate system is the 3-D coordinate system in which a graphics object is described. The convention used is that the x, y and z axes in the object coordinate system are parallel to the corresponding axes in the virtual world coordinate system (described below). This simplifies the calculations performed by the software since the transformation from object space to world space (described below) requires translation, but no rotation or scaling. A more general 3-D system would support rotation and scaling as well, but at the cost of additional calculations.

The virtual world coordinate system is the 3-D coordinate system in which the graphics objects are represented in relation to one another. It is the coordinate system of the simulated world. The xyz origin is located at 0 altitude, with the x and y axes aligned with the major compass directions. The +x direction is east, and the +y direction is north. The +z direction is up.

The player's viewing coordinate system is the 3-D coordinate system relative to the player. The viewpoint (the assumed position of the player's eye) is at the xyz origin. The +x direction is toward the right, the +y direction is down, and the +z direction is into the screen (and away from the player). The convention used in the moving object algorithm is that the z axis passes through the center of the viewport. The visible objects in viewing space are those contained in the viewing pyramid whose apex is formed by four lines drawn from the viewpoint (player's eye) through the four corners of the viewport. The pyramid is truncated by a "near" (or "higher") clipping plane parallel to the surface of the viewport.

The viewport coordinate space is the 2-D coordinate system relative to the viewport. The viewport is a rectangular viewing surface on the screen. The convention used in the moving object algorithm is that the xy origin is located in the center of the viewport. The +x direction is toward the right, and the +y direction is down. Visible objects in viewing space are perspective projected onto the viewport.

As mentioned above, the transformation of a graphics object from object space to world space involves only translation. The transformation of an object from world space to viewing space involves a translation followed by a rotation. The final stage in the transformation process is to calculate the perspective projection of the 3-D object in viewing space onto the 2D viewport surface.

The object, world and viewing spaces are all described by right-handed coordinate systems.

4. Detailed Description of BSP Data Structures.

The method of solving the hidden surface problem is usually referred to as the Painter's Algorithm. FIGS. 10 through 13 illustrate the use of the 3-D binary sectioned or partitioned database of the preferred embodiment to presort objects before rendering occurs. By presorting, the 3-D binary partitioned database permits the helmet cards to draw or render objects that are further away from the player first and then draw objects that are closer to the player. The result is that objects that are closer to the players appear to obscure the ones that are further away. FIG. 10 illustrates how the 3-D binary partition database of the preferred embodiment achieves this objective. A binary sectioning plane (BSP) is specified between the right and left sons of each intermediate node having two sons. The viewpoint coordinates are plugged into the equation for the BPP to determine on which side of the BPP the viewpoint lies.

The moving object algorithm's scenery is stored in a hierarchical 3-D database. The database is organized in the form of a binary tree. A pointer to the root node of the database is passed as an argument to the 3-D database interpreter function, dbinterp.

Each terminal (or leaf) node in the tree specifies an object (typically an convex polyhedron) composed of some number of polygons. The polygons in this object can be drawn in the order in which they are listed, and only back face removal is required to eliminate hidden surfaces. To be drawn correctly, polygons must be planar and convex, and their vertices must be listed in the clockwise direction.

Each intermediate (or nonleaf) node has one or two sons (or descendants). By convention, if a node has only one son, that son is the left son.

If an intermediate node has two sons, the objects in the son which is more distant from the viewpoint are drawn first, and the objects in the closer son are drawn second. The sign of the result if used to determine the order in which the two sons are drawn.

Specified for each node (terminal or intermediate) in the database is a bounding sphere that encloses all objects in the node. This bounding sphere is used to trivially reject nodes that are entirely invisible in the viewport. The real-time update rate of the moving object algorithm depends on being able to reject a number of objects at an early stage of the calculations, before much work has been invested in transforming them. If the bounding sphere lies entirely behind the "near" (or "hither") clipping plane, all objects within the sphere can be rejected as invisible. The objects can also be rejected if the sphere lies entirely above, below, to the right of, or to the left of the viewport. If the sphere is so distant from the viewpoint that it approaches the size of a single pixel on the screen, it can be represented as a single dot. If the sphere is smaller than a pixel, it is rejected as invisible. For the sake of efficient software execution, the bounding sphere specified for a node should be no larger than is necessary to enclose all objects contained in the node.

Each node has its own coordinate system, translated from that of the world coordinate system. The positions of objects within a node are described relative to the node's coordinate origin. The node's bounding sphere is centered at this origin as well. Each intermediate node specifies the position of the origins of its left and right sons as x, y and z displacements from its own origin. By altering these displacements within the database, the left and right sons can be moved from one position to another relative to the node without requiring changes to the portions of the database describing the left and right sons themselves.

A terminal node representing an object such as a house or a tree can be pointed to by more than one intermediate node, in which case identical copies of the object appear at more than one position in the 3-D scene. The root node's origin lies at the origin of the world coordinate system.

The database is preceded by a header that contains key parameters such as the location of the root node, the total size of the database, initial position of the player, and color palette. The palette currently supports only 16 colors. In the case of 1-bit-per-pixel displays, a table of 16 dither patterns is substituted for the color palette. The structure of the database header is as follows:

TABLE 4

| typedef struct { | /* header information for 3-D object database */ |
|---|---|
| */long dbsize; | /* length of database in bytes */ |
| long rootnode; | /* bit offset to root node of binary tree*/ |
| POINT3-D start; | /* starting FIX8 xyz coordinates in worldspace */ |
| PALET palet[16]; | /* palette of 16 colors (see typedefs.h) * / |
| PALET bwpatn[16]; | /* 16 4×8 intensity patterns for 1bit/pixel */ |
| long bcdata; | /* bit offset to object data for bouncing cube*/ |
| long bcbbox; | /* bit offset to bounding box for bouncing cube*/ |

The dbsize field contains the length of the database in bytes. This information is necessary in order to know how much storage to dynamically allocate for the database in GSP 120 memory.

The rootnode field is the bit address offset to the root node of the binary tree. the offset is specified from memory address of the rootnode field. If the rootnode field begins at GSP address A, and the rootnode field contains an offset value V, the address of the root node is calculated as (A+V).

The start field contains the starting x, y and z coordinates, i.e., the initial position of the player in world coordinates. Each coordinate value is expressed as a 32-bit fixed-point number with 8 bits of fraction. (Currently, the starting orientation if fixed—facing "north" or in the +y direction in world coordinates.)

The palet field contains a 16-color palette specified according to the TIGA color-palette format.

The bwpatn field specifies the 16 4×8 patters to be used in place of color in 1-bit-per-pixel displays.

The structure of an intermediate (or nonleaf) node in the binary tree for the 3-D being partitioned database is as follows:

TABLE 5

| field description | field size |
|---|---|
| bounding sphere radius R | 8 |
| log2 (scaling factor) F for radius R | 5 |
| node type N = 0 (intermediate node) | 3 |
| color of distant, dot-sized node | 16 |
| bit offset to leftson node | 32 |
| xyz displacements to leftson's centroid | 4*8 |
| bit offset to rightson node | 32 |
| xyz displacement to rightson's centroid | 4*8 |
| partitioning plane coeff's A,B,C,D | 4*4 |

The structure is a total of 176 bits or 22 bytes in length. The first 16 bits in the node structure contain an 8-bit unsigned bounding sphere radius R, a 5-bit log2 (scaling factor) F, and a 3-bit node type specifier, N.

An intermediate node is identified by N=0. The radius of the bounding sphere is calculated as r=R<<F, where "<<" is the C left-shift operator.

The second 16 bits specify the color of the node when it is so distant that it occupies only a single pixel (a dot) on the screen.

Offsets LSON and RSON contain the bit offsets to the left son and right son, respectively, of the node. The offsets are specified from the bit addresses of the LSON and RSON values in the GSP memory. For example, if the LSON field is stored at memory address A, and the LSON field contains the offset value V, the left son's address is calculated as (A+V).

Specified along with the bit address offsets of the two descendant nodes, LSON and RSON, are the xyz displacements of the centers (i.e., origins) of these nodes from the center (or origin) of the current node. These displacements are stored as 8-bit signed X, Y and Z fields, followed by an 8-bit F field that specifies scaling factor for X, Y and Z. These four 8-bit values are packed into a single 32-bit long word. If the current node is centered at coordinates (Xc', Yc', Zc'), the descendant's center coordinates (Xc', Yc', Zc') are calculated as follows:

$$Xc' = Xc + (X \ll F), Yc' = Yc + (Y \ll F), \text{ and} \quad (1)$$

$$Zc' = Zc + (Z \ll F)$$

The last word in the structure contains binary partitioning plane coefficients A, B, C and D. Each coefficient is 4 bits. The objects or composite objects represented by the left and right sons are separated by a plane whose equation if f(x,y,z)=A*x+B*y+C*z+D, where x, y and z are the coordinates of the parent node's centroid in world space relative to the viewpoint. The plane equation is evaluated to determine the proper order in which to draw the left and right sons, based on the Painter's Algorithm. If f(x,y,z)<0, the viewpoint is located on the left son's side of the partitioning plane; the right son is drawn first, and the left son second. Otherwise, the left son is drawn first. The plane equation coefficients are stored in a 16-bit word containing 4-bit A, B, C and D fields, each of which specifies a value in the range −8 to +7. FIG. 14 illustrates the appropriate 16-bit word. The plane equation is specified relative to the node's center (i.e., origin). If the plane intersects the center of the node then D=0.

For example, assume that the right son's center is located at xyz displacements (100,0,0), the left son is at (−100,0,0), and the partitioning plane has the equation x=0. The BPP coefficients can be selected as A=1 and B=C=D=0. If x>0, the left son is drawn first, and the right son second; if x<=0, the right son is drawn first.

The structure of an terminal (or leaf) node in the binary tree database is as follows:

TABLE 6

| field description | field size |
|---|---|
| bounding sphere radius (unsigned) | 8 |
| log2 (scaling factor) for b.s. radius | 5 |
| node type = −1 (terminal node) | 3 |
| color of distant, dot-sized node | 16 |
| word displacement to bounding box data | 16 |
| <3-D object model> | (variable) |
| <bounding box information> | (variable) |

The first 32 bits of the data structure are similar to that for the intermediate node, except that the 3-bit node type field N is set to −1 (signifying a terminal node) rather than to 0.

Offset 32 bits from the base of node structure is a 16-bit field specifying a word offset (bit offset divided by 16) to the bounding box information (to be described). Assuming that the node structure begins at symbolic address NODE, and the bounding box specification begins at address BBOX, the word offset is specified as (BBOX−NODE−32)/16. The bounding box information is optional, and can be omitted if desired. If no bounding box is specified, the offset has a null (0) value.

Offset 48 bits from the base of the node structure is the beginning of the 3-D object model (to be described), which is a description of an object composed of some number of convex polygons. The bounding box information follows the object model.

Each terminal (or leaf) node contains the description of a 3-D object. 3-D object model information is divided into two parts. The first part is a list of all 3-D points in the object. The second part is a list of all polygons in the object, specified in terms of the 3-D points given in the first part. The general format for the object model data is as follows:

TABLE 7

| field description | field size |
|---|---|
| (1st part) | |
| number n of 3-D points in list | 16 bits |
| list of n points in 3-D object space | n*32 |
| (2nd part) | |
| list of faces terminated by null (0) | (see below) |

The 3-D points listed in the first part are specified in terms of their x, y and z coordinates relative to the center of the object. Each 3-D point in the list is represented as a 32-bit value containing an 8-bit X field, 8-bit Y field, 8-bit Z field, and 8-bit F (scaling factor) field as FIG. 15 shows. The x, y and z coordinates of the 3-D point relative to the centroid of the object are calculated from these four fields as follows:

$$x = X \ll F, y = Y \ll F, \text{ and} \quad (2)$$

$$z = Z \ll F$$

The X, Y and Z fields are integers in the range −128 to +127. Field F is restricted to values in the range 0 to 7.

Following the list of 3-D points is a list of the faces of the object. Each face is a convex polygon specified as a sequence of vertices. The list of faces is terminated by a 16-bit null (0) value. Each individual face in the list is specified according to the format below:

TABLE 8

| field description | field size |
|---|---|
| number n of vertices defining polygon | 16 bits |
| polygon color | 16 |
| list of vertices v[0],v[1],. . .,v[n−1] | n*16 |

Each vertex v[.] above is a 16-bit value specified as an index into the list of 3-D points specified in the first part of the object model database. Given a list of n 3-D points, vertices are specified as indices in the range 0 to n−1. Vertices must be listed in clockwise order; that is, the vertices are given in the order n which they are visited when the boundary of the forward-facing polygon in object space is traversed in the clockwise direction.

Some 3-D applications require detection of collisions of a specified moving object with the static objects in the scenery. In the current moving object algorithm, the moving object is the "player" which is assumed to enclose the viewpoint. As currently implemented, collision detection is based on bounding boxes in world space.

The newinbbox function determines whether a point, specified in terms of its xyz coordinates in world space, has collided with any of the bounding boxes specified in the database. In the event of a collision, newinbbox returns the particular status value assigned within the database to the violated bounding box. (The status value is presumably assigned some meaning within the application.) If no collision is detected, a null (0) value is returned.

One or more bounding boxes is optionally specified for each terminal node in the tree. The bounding box information follows the object model data in the terminal node structure. Offset 32 bits into the terminal node structure is the word offset to the start of the bounding box information. If a null (0) value is given for the offset, no bounding box information is specified for the node.

To simplify comparisons with bounding box limits, box edges are constrained to be parallel to the x, y and z axes in world space. The dimensions of each bounding box are specified by six coordinates: the minimum x, y and z coordinates, xmin, ymin and zmin, and the maximum x, y and z coordinates, smax, ymax and zmax. These coordinates are specified relative to the center of the node containing the bounding box.

The list of one or more bounding boxes is terminated by a null (0) value. Each bounding box in the list is specified according to the following format:

TABLE 9

| field description | field size |
|---|---|
| bounding box type B | 16 |
| return status value S | 16 |
| minimum x, y and z values | 32 |
| maximum x, y and z values | 32 |

The bounding box type code, B, specifies the characteristics of the bounding box test to be performed. Three collision test modes can be specified by the B value. Namely, a collision is detected if the specified point in 3-D world space is (1) inside the bounding box, (2) outside the box, or (3) either inside or outside the box (unconditional).

When a collision is detected, the 16-bit status value S (whose meaning is assigned by the database author) is returned. If no collision is detected with any of the bounding boxes listed, a null (0) value is returned.

The bounding box type code, B, also specifies whether the bounding box is "padded" to make the bounding box thicker (positive paddling) or thinner (negative padding). If padding is used, the thickness of the padding is automatically taken to be one greater than the distance from the viewpoint to the "near" (or "hither") clipping plane. This padding value is useful in preventing the viewpoint from "penetrating" a polygon coincident with one of the sides of the bounding box. Without padding, the viewpoint could poke through to the other side of the polygon by cutting the polygon with the near z clipping plane. Objects that should be occluded by the polygon would then become visible, spoiling the illusion of a solid 3-D object. The padding can be specified as positive or negative, depending on whether the viewpoint is constrained to be outside or inside the bounding box. Positive padding may be used to detect when a moving object (whose center coordinates are specified for the bounding box test) approaches within a certain critical distance of the outside of the bounding box. Negative padding may be used to detect when a moving object approaches within a certain distance of the inner walls of a bounding box. Zero padding may be specified if desired.

The format of the bounding box type code, B, is specified in FIG. 16. As FIG. 16 indicates, the test mode is specified by the TM field in bits 14–15 of the status word, and the pad mode is selected by the PM field in bits 12–13.

Figures 17, 18, 19:
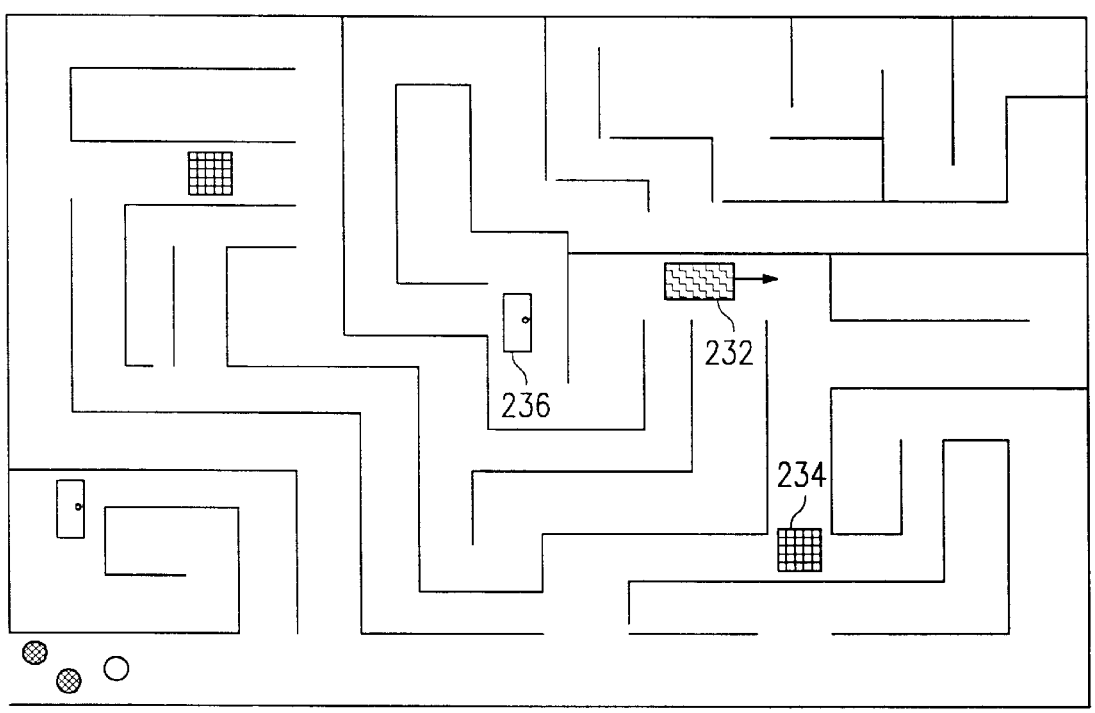

Both the minimum and maximum xyz coordinates in the bounding box are represented as 32-bit values. Each value is a point in 3-D object space specified by four 8-bit fields: an 8-bit X field, 8-bit Y field, 8-bit Z field, and 8-bit F (scaling factor) field. The 32-bit representation for the 3-D point is shown in FIG. 17. The x, y and z coordinates of the 3-D point relative t the centroid of the object are calculated from these four fields as follows:

$$x = X \ll F, y = Y \ll F, \text{ and} \quad (3)$$
$$z = Z \ll F$$

The X, Y and Z fields are integers in the range −128 to +127. Field F is restricted to values in the range 0 to 7.

C. The Rendering Process of the Preferred Embodiments

1. Overview of the Rendering Process including the Painter's Algorithm.

With the BSP database structure, the rendering process employs the Painter's Algorithm to remove hidden surfaces. The following explains the rendering process of the preferred embodiment.

The moving object algorithm software builds the 3-D scene visible on the screen in three stages. These stages are (1) interpretation of the scenery database,
(2) 3-D transformation, and
(3) drawing the polygons to the screen.

These tasks are performed by three software modules. This section describes the role of each module in converting the 3-D database and viewpoint information to the real time image on the screen.

The dbinterp function is the database interpreter. It accepts as inputs the database containing the 3-D scene description, and the viewpoint position and orientation. The interpreter's chief task is to trivially reject as many invisible objects (objects not visible on the screen) as possible in order to avoid the unnecessary work of transforming them. The interpreter also determines the order in which to draw the objects: nearer objects are drawn on top of objects that are farther away; this is the Painter's Algorithm. The output of the database interpreter is a list of objects to be transformed, along with their positions in the 3-D viewing space.

The xfrmlist function is the 3-D transformer. it accepts as input the list of objects to be transformed from the dbinterp function. The transformer rotates and translates the objects, clips them if necessary, and projects them onto the viewport. In the process, each 3-D object is broken into its constituent polygons, and a list of polygons to be drawn is output from the 3-D transformer.

The displist (that is, the displist_color or displist_mono) function is the polygon drawer. It interprets the list of polygons generated by the 3-D transformer function, xfrmlist, and draws them to the screen in the order in which they appear in the list. Each polygon is specified in terms of its color, and a list of vertices. The topmost vertex is always specified first in the list.

The dbinterp, xfrmlist and displist functions are written in assembly code appearing at Appendix A due to their critical roles in achieving real time performance. The displist module is small enough that its main loop can entirely reside in the TMS 34010's 256-byte instruction cache. (The TMS 34020's cache is twice as large.) The main loops of the dbinterp and xfrmlist modules are too large to fit entirely in cache, but the code for these functions has been carefully arranged to improve the likelihood that the instructions being executed remain cache-resident from one loop to the next.

2. Transforming Between Coordinate Systems.

The transformation from world space to viewing space is based on the player's assumed position and orientation in the world. The moving object algorithm uses a total of 12 parameters to represent the player's position and orientation in world space, corresponding to the 12 coefficients of a 4-by-3 3-D transformation matrix. These parameters are the player's x, y and z coordinates in world space, and the x, y and z components of three orthogonal unit vectors, u, v and w, that describe the player's orientation relative to the world. The u vector points to the player's right, the v vector points downward relative to the player, and the w vector points in the player's forward direction. In other words, the u, v and w vectors are aligned with the x, y and z axes in the viewing coordinate system.

Strictly speaking, only two unit vectors are required to completely specify the player's orientation—the third unit vector can always be calculated as the cross product of the first two, but at the cost of six multiplies. Maintaining all three unit vectors results in some conveniences in calculating the rotation matrix used in transforming graphics objects from world space to viewing space, as will be shown.

The transformation of a point from world coordinates (x,y,z) to viewing space coordinates (x',y',z') involves a translation followed by a rotation.

To visualize the two-step transformation process, think of the world x, y and z coordinate axes as pointing east, north, and up, respectively. Assume that initially the player is located at the world coordinate origin, facing up, with his right side facing east. In other words, the x, y and z axes of the world and viewing coordinate systems are aligned. Also assume that the u, v and w vectors emanate from a point located at coordinates (xt,yt,zt) in world space, and are at an arbitrary orientation represented by the following x, y and z components in world space:

$$x \begin{vmatrix} u \\ v \\ w \end{vmatrix} = \begin{vmatrix} Ux & Uy & Uz \\ Vx & Vy & Vz \\ Wx & Wy & Wz \end{vmatrix} \quad (4)$$

The goal is to transform the u, v and w vectors so that they are aligned with the x, y and z axes of the viewing coordinate system. This transformation is the same one that will be used to transform 3-D objects from world to viewing coordinates.

The first step is to translate all objects in world space (including the three unit vectors) by (-xt,-yt,-zt). This translation places the u, v and w vectors at the viewing coordinate origin. (Following this step, the world origin no longer coincides with the viewing origin.)

Having translated all the objects, the second step is to rotate them. The rotation should leave the u, v and w vectors aligned with the x, y and z axes in the viewing coordinate system. The rotation matrix is on the right side of the transformation below, which is applied to the coordinates translated as described in the preceding paragraph:

$$[x' y' z'] = [x - xt, z - zt, y - yt] \begin{vmatrix} Ux & Vx & Wx \\ Uy & Vy & Wy \\ Uz & Vz & Wz \end{vmatrix} \quad (5)$$

The nine rotation matrix coefficients above are simply the x, y and z components in world coordinate space of unit vectors u, v and w. Let's prove that this really works. If this is indeed the correct rotation matrix, it should leave the u, v and w vectors aligned with the x, y and z axes in the viewing coordinate system. This is easily demonstrated to be the case:

$$\begin{vmatrix} Ux & Uy & Uz \\ Vx & Vy & Vz \\ Wx & Wy & Wz \end{vmatrix} \begin{vmatrix} Ux & Vx & Wx \\ Uy & Vy & Wy \\ Uz & Vz & Wz \end{vmatrix} = \begin{vmatrix} 1 & 0 & 0 \\ 0 & 1 & 0 \\ 0 & 0 & 1 \end{vmatrix} \quad (6)$$

Note that each 1 in the matrix at the right is the result of taking the dot product of a unit vector with itself, and each 0 results from taking the dot product of two orthogonal vectors.

The perspective projection of a point in viewing space onto the surface of the viewport is based on the proportions of similar triangles, and is described in both the Foley & van Dam and the Newman & Sproull texts. Assuming that the player (the eye) is positioned at a distance d from the screen, and given a point located at viewing coordinates (x,y,z), the point is projected onto the surface of the viewport at coordinates (x',y'), where x'=x*d/z and y'=y*d/z.

The player's orientation relative to the world coordinate system is changed by rotating the three orthogonal unit vectors, u, v and w.

The moving object algorithm calls the function "rotvec" contained in the source file "flysim.c" to rotate about the viewpoint. The rotations can either be relative to the world coordinates (e.g., rotate in a plane level to the ground), or relative to the viewing coordinates (yaw, pitch and roll).

The player can pan the scenery by rotating the three orthogonal unit vectors about a pivot vector that is parallel to the world z axis, and passes through the player's position. (In other words, the rotation is in a plane parallel with the ground.) Assume that the player's orientation relative to the world coordinate system is initially represented by the three unit vectors u=(Ux,Uy,Uz), v=(Vx,Vy,Vz) and w=(Wx,Wy,Wz). The pan is accomplished by means of the following matrix calculation:

$$\begin{vmatrix} Ux' & Uy' \\ Vx' & Vy' \\ Wx' & Wy' \end{vmatrix} = \begin{vmatrix} Ux & Uy \\ Vx & Vy \\ Wx & Wy \end{vmatrix} \begin{vmatrix} \cos(t) & \sin(t) \\ -\sin(t) & \cos(t) \end{vmatrix} \quad (7)$$

Positive angle t above corresponds to a pan to the left. Note that only the x and y components of the unit vectors are affected. The z components remain unchanged by the rotation. The moving object algorithm calls the uvturn function a library function to perform this type of rotation.

Another type of rotation allows the player to yaw, pitch or roll relative to his own frame of reference, regardless of how he may be oriented with respect to the world coordinate system. During this type of rotation, one of the three unit vectors (u, v or w) remains fixed in world space, and serves as the pivot vector about which the other two unit vectors rotate. The following six rotations are possible:

1) yaw to left: rotate u toward w about pivot vector v
2) yaw to right: rotate w toward u about pivot vector v
3) pitch upwards: rotate v toward w about pivot vector u
4) pitch downwards: rotate w toward v about pivot vector u
5) roll to left: rotate u toward v about pivot vector w
6) roll to right: rotate v toward u about pivot vector w For example, the following matrix calculation performs the yaw to the left by rotating the u vector toward the w vector by angle t:

$$\begin{vmatrix} Ux' & Wx' \\ Uy' & Wy' \\ Uz' & Wz' \end{vmatrix} = \begin{vmatrix} Ux & Wx \\ Uy & Wy \\ Uz & Wz \end{vmatrix} \begin{vmatrix} \cos(t) & \sin(t) \\ -\sin(t) & \cos(t) \end{vmatrix} \quad (8)$$

This type of rotation is performed by calling the uvturn function If the two vectors are orthogonal prior to the rotation, they remain orthogonal afterwards. If the rotation angle is negative, the player yaws to the right rather than to the left. The other five player-relative rotations are similar to the one above.

The moving object algorithm currently uses a simplistic model for player movements, but this model may be improved in the future. A more accurate model could be based on the player's movement characteristics or aerodynamics, calculating the yaw, pitch and roll movements based on physical forces. Once the yaw, pitch and roll angles are determined, the u, v and w vectors can be rotated by three calls to the rotvec function: yaw first, pitch second, and roll third.

The yaw, pitch and roll angles used to calculate the position of the horizon and the setting of the player's position sensing or flight instruments are specified relative to the world coordinate system. The sines and cosines of the yaw, pitch and roll angles can be calculated from the u, v and w unit vectors, expressed in terms of their x, y and z projections in world space. Calculating the yaw, pitch and roll angles themselves turns out to be unnecessary since we will need only the sine and cosine values corresponding to these angles.

The yaw (or heading) angle is specified relative to the world x axis; if the player is pointing in the +x direction, its yaw angle is 0 degrees. The convention used for the simulator is that a positive yaw angle corresponds to rotating u toward w (right wing toward nose). Let r represent the projection of unit vector w onto the world xy plane:

$$r = \text{sqrt}(Wx*Wx + Wy*Wy) \quad (9)$$

The sine of the yaw angle is calculated as $Wx/r$, and the cosine as $Wy/r$.

The pitch angle is the angle between the unit vector w and the world xy plane. The convention used for the simulator is that a positive pitch angle corresponds to rotating v toward w (pulling the nose up). The sine of the pitch angle is $Wz$, and the cosine is r.

The roll (or bank) angle is the angle between the unit vector u and the world xy plane. The convention used for the simulator is that a positive roll angle corresponds to rotating u toward v (banking to the right). Let s represent the quantity $s = \text{sqrt}(Uz*Uz + Vz*Vz)$. The sine of the roll angle is calculated as $-Uz/s$, and the cosine as $-Vz/s$.

3. Drawing the Horizon.

Assuming the player remains fairly close to the surface of the earth, the horizon can be modeled satisfactorily as being at infinity. In other words, the earth is assumed to be flat and infinite. Given that the features of the horizon are the same in any direction, the model need not take the player heading into account. Only the player's pitch and roll need to be considered in properly positioning the horizon. Note that the pitch angle represents the orientation of the nose with respect to the ground, and is not affected if the player is permitted to roll while this orientation is maintained.

As the player's orientation pitches up and down, the horizon should appear to move accordingly. Assuming zero roll for the moment, the level (height on the screen) of the horizon seen through the cockpit window depends solely on the pitch. The player's height or altitude is assumed to be zero. Because the horizon lies at infinity, any finite altitude the player may have can be neglected.

To take into account the effect of the roll angle, consider first a point at infinity on the z axis in the viewing coordinate system. This point will always lie at the same position on the screen—the center of the viewport, according to our conventions. Referring to the center of the viewport as the reference point, a positive pitch angle (nose up) places the reference point above the horizon (in the blue of the sky), and a negative pitch angle places it below the horizon (in the dirt).

Now imagine a normal vector drawn from the horizon line to the reference point. The intersection of this vector with the horizon occurs at a point to be referred to as the horizon point. As the roll angle is permitted to change, the horizon point appears to rotate about the reference point.

If the pitch is held constant while the roll angle changes, the horizon point races a circle about the reference pint. The angle the horizon makes with the player's horizontal is the negative of the player's roll angle with respect to the world. The radius of the circle is a function of the pitch angle alone. If the player's assumed distance from the screen is d, and the pitch angle is a, the radius r of the circle is calculated as $r = d*\tan(a)$. (A negative r means that the reference point lies "in the dirt" rather than "in the blue".)

To summarize, the steps followed in constructing the horizon line are as follows:

(1) Calculate the distance r of the reference point (center of viewport) to the horizon point (nearest point on horizon) from pitch angle a, and the player's distance d from the screen:

$$r = d*\tan(a)$$

(2) Rotate the horizon point about the reference point by the negative of the roll angle.
(3) The horizon line passes through the horizon point, and is normal to the line from the reference point to the horizon point.

Given that the reference point lies at the center of the viewport, and that the horizon point lies outside the circle that encloses the viewport, the horizon line is not visible.

4. Interpreting the Database.

The dbinterp function interprets a hierarchical database containing the 3-D scenery in world space. The database is organized as a binary tree whose terminal (or leaf) nodes are the individual objects to be drawn. The output form the dbinterp function is a list of polygons and dots to be transformed, clipped, and projected onto the screen. This function is designed to trivially reject 3-D objects which are not visible on the screen. To this end, the function performs clipping based on bounding spheres, and elimination of unnecessary detail from distant objects.

The two arguments are pointers rootnode and q. Argument rootnode points to the rootnode of the hierarchical 3-D database. Argument q points to the output array, in which the function stores a list of the objects in 3-D space that need to be transformed, projected, and drawn to the screen. The sequence in which objects appear in the output list determines the order in which they will be drawn.

Each iteration if the main loop in the dbinterp routine considers one node in the binary tree, beginning with the rootnode. Each node represents an atomic object (if terminal node) or composite object (if intermediate node). A composite object is composed of some number of atomic objects. An atomic object is composed of a number of polygons (typically composing a polyhedron) that can be drawn in the order in which they are listed n the terminal node structure. Only back face elimination is necessary for the polygons comprising the object to be drawn in the correct sequence (according to the Painter's Algorithm). The 3-D coordinates of each vertex in the object are specified relative to the center of the node. This allows the node to be translated in 3-D virtual world space without affecting the description of the object contained in the node.

The current moving object algorithm requires that a bounding sphere be specified for each node n the database. Included in the data structure for each node (terminal and intermediate) is the radius of the bounding sphere that encloses all objects contained int he node. The center of the sphere is assumed to coincide with the center coordinates of the node.

The left and right sons of an intermediate node represent the division of the group of objects comprising that node into two subgroups. By convention, if an intermediate node has only one descendant, that descendant is the left son; the pointer to the right son is a null (0) pointer.

When an intermediate node has two sons, the more distant son (or rather, the objects contained in the son) is drawn first, after which the nearer son can be drawn. Each son is in turn a node which may also have two sons which are drawn in back-to-front order.

A node having two sons contains the description of a binary partitioning plane (BPP) that cleanly separates the two sons (and the objects they contain). The BPP is used to determine the order in which to draw the two sons, according to the Painter's Algorithm. If the viewpoint lies on the left son's side of the BPP, the right son is drawn first, and the left son second; otherwise, the left son is drawn first. The BPP is specified in terms of the A, B, C and D coefficients of its plane equation, $$f(x,y,z)=Ax+By+Cz+D \tag{10}$$

where the viewpoint is located at coordinates (x,y,z) relative to the center of the current node.

The dbinterp function divides the polygons in its output list into two categories: "near" and "far" polygons. The division into near and far polygons is actually based on size rather than distance. If the projection on the screen of the bounding sphere for a terminal node exceeds a certain threshold size, all the polygons comprising the object are treated as near polygons; otherwise, they are treated as far polygons.

Near polygons are be preclipped; that is, they are clipped to the viewport limits before being drawn. Far polygons, on the other hand, are postclipped; that is, they are clipped on a line-by-line basis as they are drawn. The division of polygons into near and far types are for the purpose of computational efficiency.

Postclipping is used for far (small) polygons. Because preclipping polygons involves some computational overhead, postclipping the smaller ones avoids this overhead, allowing the 340×0's built-in clipping hardware to automatically clip each horizontal fill line as it is drawn.

Near (large) polygons, however, are more efficiently dealt with by preclipping, which cuts off the portions of each polygon lying outside the viewport which would otherwise consume considerable time during the drawing phase.

A third category of object can be specified in the output list. If a node is so distant that the projection of its bounding sphere on the screen approaches the size of a pixel, it can be represented as a single dot in the output list.

If a node can be rejected by any of the tests above, it requires no further processing. If another node is available for processing, that node is processed during the next iterating of the main loop of the dbinerp function. Otherwise, the output list is terminated, and the function is completed.

If a node cannot be rejected by the five tests above, a check is made to determine whether the node is terminal or intermediate.

In the case of an intermediate node, a check is made to determine whether the node has one or two sons. If the node has a single son, that son is processed during the next iteration of the main loop of the dbinterp function. If the node has two sons, the nearer son is pushed onto a stack for later processing, and the farther son is processed during the next iteration of the main loop. The data structure for an intermediate node contains pointers to its left and right sons, and the x, y and z displacements from its center to the centers of its sons. The four parameters pushed onto the stack to represent the near son are a pointer to the son's node data structure, and the x, y and z coordinates at the son's center.

5. Transforming Objects.

The xfrmlist function transforms a list of 3-D objects into viewing space, clips them if necessary, and perspective projects them onto the screen. In the process, the objects are decomposed into their constituent polygons. Objects whose projections on the screen approach pixel size can be represented simply as dots.

The two arguments, p and q, are pointers to the start of the input and outputs lists, respectively. The input list (or transform list) specifies a number of 3-D objects to be transformed. The output list (or display list) specifies a number of polygons and dots ready to be drawn to the screen.

Each iteration of the main loop of the xfrmlist function processes a "near" object, a "far" object, or a dot from the input list. As explained in the description of the dbinerp function, objects composed of polygons are categorized as either "near" or "far", based on their approximate size as they appear on the screen.

Each entry in the input list for a near or far object contains the xyz coordinate values at the center of the object in viewing space, and also a pointer to the 3-D object model. Within the object model, the xyz coordinates of the object are specified relative to the center of the object in object space. The xfrmlist function transforms the object from object space to viewing space by first rotating it about is center, and then translating it to the specified center coordinates (xc,yc,zc) in viewing space.

The xfrmlist function is less than that required by near polygons. The portion of the xfrmlist routine that handles far polygons is small enough to fit into the 34010's cache. (The TMS34020's cache is twice as large.) Statistically, far polygons should significantly outnumber near polygons, and the likelihood of the far polygon code remaining in cache from one interaction to the next is high.

The xfrmlist function transforms each near polygon to a normalized viewing pyramid (Foley & van Dam refer to this as a "canonical clipping volume" in their text) before calling the polygon clipper function, clippgon.

The clip.object function first performs a back face test to determine whether the polygon can be rejected without further processing. If the polygon is forward facing, the function compares the polygon to the boundaries (clipping planes) of the viewing pyramid, and cuts off any portion of the polygon that lies outside the pyramid, and is not visible.

In the worst case, the polygon could violate all five clipping planes. The polygon would then be clipped in three passes through the list of verticles**. During the first pass, the clip.object function would clip the polygon to the "near" clipping plane. It would clip the polygon to the left and right planes during the second pass, and to the top and bottom planes during the third pass.

A final pass through the verte list is required for the clippgon onto the screen. The resulting polygon is output to the output list (or display list).

6. Displaying The Scene.

The displist function (really two similar functions, displist color_color and displist_mono) draws a sequence of polygons and dots to the screen in the sequence in which they appear in the display list.

Each polygon in the display list must be convex, and is specified as a list of xy coordinate pairs representing the vertices of the polygon. The first xy coordinate pair in the list represents the position of the topmost vertex in the polygon; that is, the vertex having the minimum y value. The vertices are listed in clockwise order, assuming the convention that x coordinates on the screen increase from left to right, and y coordinates from top to bottom.

A "dot" is drawn to the screen as a single pixel.

The transform list is the list output from the dbinterp function, and input to the xfrmlist function. It specifies the 3-D objects to be transformed and perspective projected before being drawn to the screen.

The specification for each polygon or dot in the transform list begins on an even 32-bit boundary in memory, and the first item in each specification is a 16-bit function code indicating the type of graphics primitive.

Near and far polygons are designated in the transform list by function codes of 1 and 2, respectively. The transform list specification for a polygon is as follows:

TABLE 10

| field description | field size |
| --- | --- |
| function code (1 for near, 2 for far) | 16 bits |
| constant 0 | 16 |
| x center coordinate, xc | 32 |
| y center coordinate, yc | 32 |
| z center coordinate, zc | 32 |
| pointer p to 3-D object model | 32 |

Parameters xc, yc and zc are the object's center coordinates in viewing space. Each coordinate is represented as a 32-bit fixed-point number with 8 bits of fraction. (Call this the FIX8 format.) The last parameter is a 32-bit pointer to the 3-D object model. The object model specifies the vertices for all the polygons that make up the object. The xyz coordinates of the vertices are specified in object space relative to the center of the object.

A "dot" is a single pixel, and is designated in the transform list by a function code of 1. The transform list format specifying a dot is as follows:

TABLE 11

| field description | field size |
| --- | --- |
| function code (1 for dot) | 16 bits |
| dot color | 16 |
| x coordinate | 16 |
| y coordinate | 16 |

The second item in the specification is a 16-bit value specifying the dot color. The last two items are the x and y coordinates of the dot, specified as 16-bit integers. Note that these are the x and y coordinates of the dot on the screen; in other words they have been transformed and projected onto the screen before being placed into the transform list. These coordinate values will be copied by the xfrmlist function without change from the transform list to the display list.

The transform list is terminated by a function code of −1. The display list is the list output from the xfrmlist function, and input to the displist function. It specifies the polygons and dots to be drawn to the screen.

The specification for each polygon or dot in the display list begins on an even 32-bit boundary in memory, and the first item in each specification is an 8-bit function code indicating the type of graphics primitive to be drawn.

The function code for a polygon is 0. The display list format for a polygon is as follows:

TABLE 12

| field description | field size |
| --- | --- |
| function code (0 for polygon) | 8 bits |
| vertex count, n | 8 |
| polygon color | 16 |
| first x coordinate, x[0] | 16 |
| first y coordinate, y[0] | 16 |
| second x coordinate, x[1] | 16 |
| second y coordinate y[1] | 16 |
| last x coordinate, x[n − 1] | 16 |
| last y coordinate, y[x − 1] | 16 |

The second item in the specification is the number of vertices in the convex polygon. The third item is the polygon color. The remainder of the specification is an array of x and y coordinate pairs representing the positions of the vertices on the screen. The first xy coordinate pair specifies the position of the topmost vertex in the polygon, that is, the vertex having the minimum y value. The vertices are listed in clockwise order, assuming the convention that x coordinates on the screen increase from left to right, and y coordinates from top to bottom. Coordinates are specified as fixed point values with 2-bit fractions (Call this the FIX2 format.)

A "dot" is drawn as a single pixel, and is specified in the display list by a function code of 1. The display list format specifying a dot is as follows:

TABLE 13

| field description | field size |
| --- | --- |
| function code (1 for dot) | 8 bits |
| constant 0 | 8 |
| dot color | 16 |
| x coordinate | 16 |
| y coordinate | 16 |

The second item in the specification is a byte containing constant 0. The third item is the dot color. The last two items are the x and y coordinates of the dot. Coordinates are specified as integers.

The display list is terminated by a function code of −1.

As described above, the method used to solve the hidden surface problem involves organizing the 3-D database as a binary tree. Whenever an intermediate node in the tree branches to two descendant nodes, a binary partitioning plane (BPP) is specified that separates the two descendants. The database interpreter evaluates the BPP equation determine on which side of the BPP the viewpoint lies. This determines in which order the two descendants are drawn to correctly implement the Painter's Algorithm.

Exemplary Applications of The Preferred Embodiment

A. Flight Simulator Application.

The following discussion describes running the moving object algorithm and 3-D binary partitioned database of the preferred embodiment. The following files implement a demonstration of these concepts that runs on prototype hardware consisting of a TMS 34010 graphics processor in conjunction with a DS5000 microcontroller. The code described here runs on the graphics processor.

The code is complied using the file makefile. The file lc.cmd links the compiled code and downloads the executable module from a PC to the TMS 34010 processor. The top-level control of the program is embodied in the file flip.c. This program uses a world database represented in world.asm, and implements a version of the maze game as described below.

Figure 20:
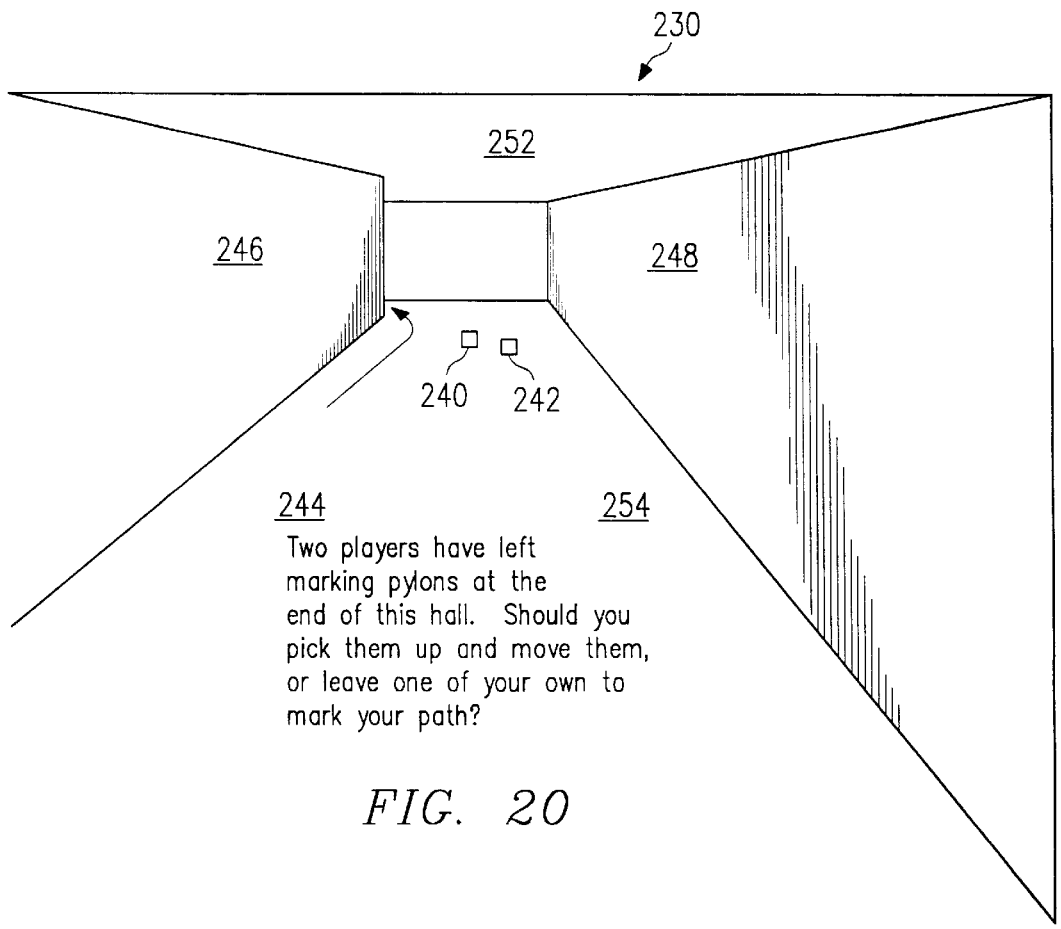

The files containing the major portion of the code that runs the maze simulation are:

flip.c—top-level control, initialization
interp.c—interpret input commands from the user
move,c—update moving objects in the world database
render.c—render the scene for display The major extensions to the original code are found primarily in the following files:

flip.c—top-level control, initialization
move.c—moving object extensions
scene.c—moving object extension
sceneo.c—moving object extension
scenel.c—moving object extension
bbox.c—bounding box collision detection
bullet.c—moving object extensions B. "GRACE", a Maze Game FIGS. 19 and 20 illustrate an example of a multi-player game application that the virtual reality system of the preferred embodiment may use. The game is entitled "GRACE" and has as its object to compete against other players seeking to be the first in successfully navigating a maze 230 shown in FIG. 19. Maze 230 is filled with pitfalls such as moving obelisks 232, mashers 234 and spinning doors 236. Obelisks 232 move through maze 230 randomly and run over a player, costing a player one "life." In the example, a player has 9 lives. Mashers 234 are stationary, but bounce up and down in the path of maze 230. Players must pass underneath masher 234 without getting squashed. squashing a player costs him one "life." Spinning doors 236 are stationary, but spin around. One side is safe. If you passing through the safe side, nothing happens. The other side is dark. Passing through the dark side causes the door to transport the player into a random place in maze 230.

Each player begins with a certain number of points or lives, e.g., nine lives in the preferred embodiment. A player loses a point every time obelisk 232 runs down the player, a masher 234 catches the player, or the player fails to maneuver through any other pitfalls that may be envisioned for this easily extensible game. If there is no ceiling in a certain part of maze 230, the player may attempt to jump up in the air to catch a glimpse of the top of the maze. Players may also drop "electronic bread-crumbs" along the way through the maze. Other players, however, may move any player's markers in an attempt to foil the opponent's efforts.

FIG. 19 illustrates the 3-D view of maze 230 that a player would see through helmet 28. While placing several mazes on a single ROM card, the players may select a favorite maze or let the game mechanics or built-in functions, choose one at random. Multi-level mazes will add another dimension (both in space and difficulty) to the game. In FIG. 21, there is shown where two players have left marking pylons 240 and 242 within hallway 244 of maze 230. Hallway 244 has walls 246, 248 and 250 and ceiling 252. On floor 254 of hallway 244, the player travels and they turn the corner to continue down a maze. As the player continues down the maze, the view of maze 230 changes to reflect the position of the player according to the database of the game.

The GRACE game is just one simple application of the preferred embodiment. In addition to entertainment/game applications, the virtual reality system of the preferred embodiment has uses in many other fields. In education, for example, an architectural student may enter a virtual world model of a building he has designed. Likewise, a medical student may "tour" a model of the brain or a chemist may walk around and inside a 3-D model of a complex molecule. With the multi-player virtual reality system of the preferred embodiment, both a student and a teacher may be in the same virtual reality world as the same time. For example, a travel agent may provide a potential customer a guided tour of a model of a resort location such as Disney World, for example, to assist the customer in planning a vacation. Other applications using the low-cost virtual realty system of the preferred embodiment abound. These applications will be clearly within the scope of the present invention.

Although the invention has been described with reference to the above specified embodiments, this description is not meant to be construed in a limiting sense. Various modifications of the disclosed embodiment, as well as alternative embodiments of the invention will become apparent to person skilled in the art upon reference to the above description. It is therefore contemplated that the appended claims will cover such modifications that fall within the true scope of the invention.

What is claimed is:

1. A method of modeling relative position and relative movement of objects in a virtual reality environment, comprising the steps of:

representing graphically a first object and a second object in the virtual reality environment on a graphical display;

determining a first partitioning plane between said first object and said second object;

determining a second partitioning plane between said first object and said second object in response to either of said first object or said second object moving across said first partitioning plane; and representing graphically on said graphical display in response to said second partitioning plane determining step new relative positions of said first object and said second object as a result of the relative movement of said first object and said second object to movement of a viewer within said virtual reality environment by selectively obscuring said first object and said second object according to the relative position of said first object and said second object in said virtual reality environment to an observation point of said viewer in said virtual reality environment.

2. The method of claim 1, wherein said step of representing graphically on said graphical display the relative movement further comprises the step of representing on said graphical display the relative movement of said first object and said second object in accordance with a plurality of viewers to perceive being in said virtual reality environment and viewing from within said virtual reality environment the relative position and the relative movement of each other in said virtual reality environment.

3. The method of claim 2, further comprising the steps of storing data describing said virtual reality environment in a master database and updating said master database with data describing the relative movement of the objects.

4. The method of claim 3, wherein said storing step further comprising the step of configuring said master database as a binary tree describing the relative Position of the objects, wherein said binary tree includes a terminal node associated with each of the objects, an intermediate node associated with said second partitioning plane, and a root node associated with said first partitioning plane.

5. The method of claim 4, wherein said master database configuration step further comprises the step of forming said intermediate node in response to at least one of the objects crossing said first partitioning plane.

6. The method of claim 1, further comprising the step of determining said relative movement of the objects from a rotating point of view in a plane within said virtual reality environment.

7. The method of claim 1, further comprising the step of determining said relative movement of the objects from a predetermined set of viewing coordinates within said virtual reality environment.

8. The method of claim 7, further comprising the step of determining said relative movement of the objects for measuring yaw of a moving object within said virtual reality environment.

9. The method of claim 7, further comprising the step of determining said relative movement of the objects for measuring pitch of a moving object within said virtual reality environment.

10. The method of claim 7, further comprising the step of determining said relative movement of the objects for measuring roll of a moving object within said virtual reality environment.

11. The method of claim 1, further comprising the step of determining hidden surface removal in response to said relative movement between the objects within said virtual reality environment.

12. The method of claim 1, further comprising the step of determining clipping of distant objects during said relative movement between the objects within said virtual reality environment.

13. The method of claim 1, further comprising the step of determining elimination of distant objects in Preparation for performing perspective approximations within the virtual reality environment.

14. A system for modeling relative position and relative movement of objects in a virtual reality environment, comprising:
 a graphical display for representing graphically a first object and a second object within the virtual reality environment;
 circuitry for determining a first partitioning plane between said first object and said second object;
 circuitry for determining a second partitioning plane between said first object and said second object in response to either of said first object or said second object moving across said first partitioning plane; and
 circuitry responsive to said second partitioning plane determining circuitry for representing graphically on said graphical display new relative positions of said first object and said second object as a result of the relative movement of said first object and said second object to movement of a viewer within said virtual reality environment by selectively obscuring said first object and said second object according to the relative position of said first object and said second object in said virtual reality environment to an observation point of said viewer in said virtual reality environment.

15. The apparatus of claim 14, wherein said circuitry for representing graphically on said graphical display the relative movement further comprises circuitry for representing graphically the relative movement of said first and second object in accordance with a plurality of viewers to perceive being in said virtual reality environment and viewing from within said virtual reality environment the relative position and the relative movement of each other in said virtual reality environment.

16. The apparatus of claim 15, further comprising a master database containing data describing the virtual reality environment, and circuitry for updating said master database with data describing the relative movement of said objects.

17. The apparatus of claim 16, further comprising circuitry for configuring said master database as a binary tree describing the relative position of the objects, wherein said binary tree includes a terminal node associated with each of said objects, an intermediate node associated with said second partitioning plane, and a root node associated with said first partitioning plane.

18. The apparatus of claim 17, wherein said master database configuration circuitry comprises circuitry for forming said intermediate node in response to at least one of the objects crossing said first partition plane.

19. The apparatus of claim 14, further comprising circuitry for determining said relative movement of the objects from a rotating point of view in a single plane within said virtual reality environment.

20. The apparatus of claim 14, further comprising circuitry for determining said relative movement of the objects from a predetermined set of viewing coordinates within said virtual reality environment.

21. The apparatus of claim 20, further comprising circuitry for determining said relative movement of the objects by measuring yaw of a moving object within said virtual reality environment.

22. The apparatus of claim 20, further comprising circuitry for determining said relative movement of the objects by measuring pitch of a moving object within said virtual reality environment.

23. The apparatus of claim 20, further comprising circuitry for determining said relative movement of the objects by measuring roll of a moving object within said virtual reality environment.

24. The apparatus of claim 14, further comprising circuitry for determining hidden surface removal in response to said relative movement between the objects within the virtual reality environment.

25. The apparatus of claim 14, further comprising circuitry for determining clipping of distant objects during said relative movement between the objects within said virtual reality environment.

26. The apparatus of claim 14, further comprising circuitry for determining elimination of distant objects in preparation performing perspective approximations within the virtual reality environment.

* * * * *